United States Patent [19]

Furukubo

[11] 4,410,133
[45] Oct. 18, 1983

[54] TWO WAY FLUID SWITCHOVER VALVE WITH CROSSOVER PROTECTION

[75] Inventor: Tatsumi Furukubo, Susono, Japan

[73] Assignee: Toyota Jodosha Kabushiki Kaisha, Aichi, Japan

[21] Appl. No.: 335,338

[22] Filed: Dec. 29, 1981

[30] Foreign Application Priority Data

Feb. 16, 1981 [JP] Japan .............................. 56-20483[U]
Apr. 28, 1981 [JP] Japan .............................. 56-62051[U]
Jun. 30, 1981 [JP] Japan .............................. 56-97031[U]

[51] Int. Cl.³ ............................................. F01P 7/02
[52] U.S. Cl. ................................... 236/34.5; 236/100
[58] Field of Search ................... 236/34, 100, 34.5

[56] References Cited

U.S. PATENT DOCUMENTS

| | | | |
|---|---|---|---|
| 2,353,577 | 7/1944 | Magrum et al. | 236/34 |
| 2,400,615 | 5/1946 | Warrick et al. | 236/34.5 |
| 2,444,711 | 7/1948 | Shaw | 236/34.5 |
| 4,196,847 | 4/1980 | Gobien | 236/34.5 |
| 4,280,655 | 7/1981 | Duprez et al. | 236/34.5 |
| 4,288,031 | 9/1981 | Hass | 236/34.5 |
| 4,344,564 | 8/1982 | Magnuson | 236/34.5 |

*Primary Examiner*—William E. Tapolcai

*Attorney, Agent, or Firm*—Stevens, Davis, Miller & Mosher

[57] ABSTRACT

A valve controls mutual communication between first, second, and third spaces, and includes a first valve seat controlled by a first valve element communicating between the first space and the second space, and a second valve seat controlled by a second valve element communicating between the first space and the third space. The first valve member is biased towards the first valve seat, and the second valve member is biased away from the second valve seat with less biasing force. A temperature sensitive actuator includes first and second actuator members and is supported between the first actuator member bearing on the first valve element and the second actuator member bearing on the second valve element. This actuator, with rise in the temperature of the fluid generally around it, moves the first and second actuator members with respect to one another so as to exert by the first actuator member a force on the first valve member which urges it away from the first valve seat, and so as to exert by the second actuator member an equal force on the second valve member which urges it towards the second valve seat. Thus communication between the first and second spaces is definitely interrupted, before communication commences to be established between the first and third spaces.

10 Claims, 5 Drawing Figures

TWO WAY FLUID SWITCHOVER VALVE WITH CROSSOVER PROTECTION

BACKGROUND OF THE INVENTION

The present invention relates to a valve such as is suitable for switching cooling fluid flows in an internal combustion engine cooling system, and more particularly relates to a valve such as is suitable for such use in a particular type of internal combustion engine cooling system which provides either combined cooling for a cylinder head and a cylinder block of the engine, or either partly or totally separated cooling for the cylinder head and the cylinder block, according to operational conditions.

The concept of the cooling system which will be later described as a particular preferred use for the valve of the present invention is more particularly described in U.S. Pat. No. 4,370,950 issued Feb. 1, 1983 made by the same applicant as the present application and assigned to the same assignee, and based upon prior Japanese patent application Ser. No. 169933/80, priority of which was claimed, which was filed on Dec. 2, 1980, i.e. previous to the filing on Feb. 16, 1981 of the earliest of the parent Japanese patent applications of the present application of which priority is being claimed in the present application. In fact, this previous prior art invented by the same inventor as the present invention was in its turn based upon a prior art engine cooling system and method developed by a colleague of the present inventor, for which previous concept Japanese Patent Application No. 68036/80 was filed, and for which prior art concept also it is known to the present inventor that the application for U.S. Pat. No. 4,369,738 was filed Nov. 28, 1981 previous to the filing of the above identified previous U.S. application and of the present application, claiming the priority of said previous Japanese application No. 68036/80. All said previously applied Japanese and U.S. patents and applications relating to said prior art concepts have been assigned to the same assignee as is the present application; and the present inventor hereby desires to acknowledge his debt to this previous proposal by said colleague, and to incorporate the subject matter of U.S. Pat. No. 4,369,738 as well as the subject matter of his own above identified previous U.S. Pat. No. 4,370,950 by reference into the present application, by way of background prior art.

There are various considerations which arise with regard to the cooling of internal combustion engines which are cooled by the circulation of liquid cooling fluid in passages or cooling jackets formed in the cylinder head and in the cylinder block thereof. Some of these considerations relate to the cooling of the cylinder head, and others to the cooling of the cylinder block. Nowadays the prior art type old or conventional ways of cooling an internal combustion engine, in which the cooling fluid for the cylinder head was always completely mixed with that for the cylinder block, thus ensuring that the cylinder head and the cylinder block were always kept at substantially the same temperature, have become inadequate.

One of these considerations is that it is important to maximize the thermal efficiency of an internal combustion engine, and in order to do this it is effective to increase the compression ratio of the engine. However, increase of the compression ratio of the engine is limited by the occurrence of so called knocking or pinging, i.e. of detonation caused by compression ignition, not caused by any spark from a spark plug, of the air-fuel mixture within the combustion chambers of the engine. The occurrence of knocking is generally reduced by keeping the cylinder head as cool as possible, and accordingly when an internal combustion engine is being operated, especially in operational conditions in which the occurrence of knocking is a high possibility such as high rotational speed high engine load operational conditions, it is very important to cool the cylinder head down to as low a temperature as possible, consistent with other operational considerations.

On the other hand, it is not very advantageous to cool down the cylinder block of the engine to a very low temperature, because in that case the temperature of the lubricating oil contained within the cylinder block, which is of course strongly influenced by the temperature of the cylinder block, becomes rather low, thus increasing the viscosity of this lubricating oil and causing unacceptably high mechanical energy losses in the engine. Further, because the viscosity of the lubricating oil within the cylinder block when this oil is cold, i.e. when it is not at proper operating temperature, is higher than when said lubricating oil is at operating temperature, therefore of course while this lubricating oil is cold this causes substantially increased use of fuel by the internal combustion engine, which is very wasteful. Further, if the temperature of the walls of the cylinders of the engine, i.e. the temperature of the bores thereof, becomes low, then the amount of noxious components in the exhaust gases emitted by the engine rises, which can cause a serious problem in view of the standards for control of pollution by automobiles, which are becoming more and more severe nowadays.

Another problem that occurs if the temperature of the cylinder block gets low is that wear on the various moving parts of the internal combustion engine, especially bore wear, rises dramatically. In fact, a large proportion of the wear on the bores of an internal combustion engine occurs when the engine is in the non fully warmed up condition, both because the lubricating qualities of the lubricating oil in the engine are not good at low temperatures, and also because the state of mechanical fit to which the parts of the engine are "worn in" or "run in" is appropriate to their physical dimensions when at proper engine operating temperature, and accordingly in the cold or the semi cold condition these parts do not mate together very well.

These problems that arise when the cylinder block of an internal combustion engine becomes too cold during actual running operation of the engine of course also apply with equal force during the warming up process of the internal combustion engine, after it has been started up from the cold condition and before it has attained normal operating temperature. Especially, the problem of excessive wear on the moving parts of the internal combustion engine, and the problem of excessive emission of noxious components in the exhaust gases of the internal combustion engine, are particularly serious during warming up operation. In fact, in view of this matter, it has in the past been an important design goal in the designing of internal combustion engines for the moving parts thereof to be warmed up as soon as practicable, or at any rate for these moving parts to be brought to an intermediate temperature higher than a very cold non operating temperature as soon as practicable.

According to these considerations, it is important to warm up the cylinder block of an internal combustion engine as quickly as possible, when the engine is started from the cold condition, and to keep the cylinder block at quite a high operating temperature thereafter. A difficulty arises in this regard, because during the operation of an internal combustion engine most of the heat which is being generated in the combustion chambers thereof by combustion of air-fuel mixture therein is in fact communicated not to the cylinder block of the engine, but to the cylinder head thereof. Therefore transfer of heat from the cylinder head wherein said heat is mostly generated to the cylinder block is very important, especially during the warming up process of the engine. Of course, such heat transfer can take place by the usual process of heat conduction, since the cylinder head is clamped to the cylinder block, typically however with the interposition between of a head gasket which may have a rather low heat conductivity. However, it is desirable to convey heat from the cylinder head to the cylinder block during engine warmup more quickly than can be accomplished by this conduction process, and the conventional above described mixing of the cooling fluid circulating within the cylinder head with the cooling fluid circulating within the cylinder block during engine warmup is effective for achieving this.

In the prior art previous to the above particularly identified commonly assigned proposals, it has been proposed to provide completely independent systems for cooling the cylinder head and for cooling the cylinder block, in order to fulfill the first above described objective of cooling the cylinder head to a low temperature in order to avoid knocking, while keeping the cylinder block warmer, and each of these systems has been equipped with its own cooling fluid pump, conduits, radiator etc. However, such a system does not provide for the above described transfer of heat during the engine warming up process from the cylinder head to the cylinder block via the cooling fluid, and since the cylinder block has a considerably large heat capacity this means that the cylinder block does not warm up quickly from the cold condition, with the ill effects detailed above. Also, the provision of two independent cooling systems increases weight to an unacceptably high extent, and increases manufacturing cost. Further, since in the above described system two independent radiators are used, and the flow amount through each of them is individually regulated, it is very difficult to use total radiator cooling capacity fully, because although in some particular set of operational conditions the full cooling capacity of one radiator of one cooling system may not be completely required, it is not practicable to utilize this spare cooling capacity in order to provide additional cooling in the other cooling system, and accordingly one cooling system may become overloaded, while the other is not fully loaded. This operational inflexibility is very troublesome.

Therefore, in the previous proposal by the same inventor as the present application, i.e. the proposal of U.S. patent application Ser. No. 264,866, there was proposed, for an internal combustion engine comprising: (a) a cylinder head formed with a head cooling jacket for cooling said cylinder head, said head cooling jacket being formed with a cylinder head inlet and a cylinder head outlet; (b) a cylinder block formed with a block cooling jacket for cooling said cylinder block, said block cooling jacket being formed with a cylinder block inlet and a cylinder block outlet; and (c) a radiator formed with an inlet and an outlet; a cooling system, comprising: (d) a first pump for impelling cooling fluid through said head cooling jacket from said cylinder head inlet towards said cylinder head outlet; (e) a second pump for impelling cooling fluid through said block cooling jacket from said cylinder block inlet towards said cylinder block outlet; (f) a block recirculation conduit system leading from said cylinder block outlet of said block cooling jacket so as to supply flow of cooling fluid, from a downstream part of said block recirculation conduit system, to said cylinder block inlet of said block cooling jacket; (g) a main recirculation conduit system, an upstream part of which is communicated to said cylinder head outlet of said head cooling jacket, and a downstream part of which is communicated to said inlet of said radiator; (h) a radiator output conduit system, leading from said outlet of said radiator to said cylinder head inlet of said head cooling jacket; (i) a first junction assembly between said block recirculation conduit system and said main recirculation conduit system at upstream parts thereof, which at least sometimes allows flow between said part of said block recirculation conduit system and said part of said main recirculation conduit system; (j) a second junction assembly between a downstream part of said block recirculation conduit system and a part of said radiator output conduit system, which at least sometimes allows flow between said part of said block recirculation conduit system and said part of said radiator output conduit system; (k) and a mechanical non-electrical control valve assembly which is incorporated in said first junction assembly and said second junction assembly and which controls the allocation of flow through said head cooling jacket and flow through said block cooling jacket between said block recirculation conduit system and said main recirculation conduit system, according to a set of parameters which include the temperature of the cooling fluid passing out of said block cooling jacket; (l) wherein said control valve assembly: when it detects a temperature of the cooling fluid flow passing out of said block cooling jacket of less than a first predetermined temperature, is so switched that it directs substantially all the cooling fluid flow through said head cooling jacket which is passing out through said cylinder head outlet and also substantially all the cooling fluid flow through said block cooling jacket which is passing out through said cylinder block outlet to flow into said upstream part of said block recirculation conduit system, not directing any substantial cooling fluid flow into said upstream part of said main recirculation conduit system; when it detects a temperature of the cooling fluid passing out of said block cooling jacket of greater than said first predetermined temperature but less than a second predetermined temperature greater than said first predetermined temperature, is switched so that it directs substantially all the cooling fluid flow through said head cooling jacket which is passing out through said cylinder head outlet to flow into said upstream part of said main recirculation conduit system and through said radiator, and so that it directs substantially all the cooling fluid flow through said block cooling jacket which is passing out through said cylinder block outlet to flow into said upstream part of said block recirculation conduit system; and, when it detects a temperature of the cooling fluid passing out of said block cooling jacket of greater than said second predetermined temperature, is so switched that it directs substantially all the cooling fluid flow through said head cooling jacket which is passing out through said cylinder head outlet and also substantially all the cooling fluid flow through said block cooling jacket which is passing out through said cylinder block outlet to flow into said upstream part of said main recirculation conduit system and through said radiator, said two cooling fluid flows being mixed within said main recirculation conduit system and within said radiator, not directing any substantial cooling fluid flow into said upstream part of said block recirculation conduit system.

By such a construction, before said internal combustion engine has warmed up to said first predetermined temperature: all of said cooling fluid flowing through said head cooling jacket and also all of said cooling fluid flowing through said block cooling jacket pass out of said cylinder head outlet and said cylinder block outlet respectively, then meet in said first junction assembly and both enter into said block recirculation conduit system, then flow down said block recirculation conduit system and diverge in said second junction assembly, said head jacket cooling fluid flow then entering into said radiator output conduit system and passing to said cylinder head inlet, while said block jacket cooling fluid flow passes down said block recirculation conduit system to said cylinder block inlet, neither of said cooling fluid flows therefore passing through said radiator so that neither of them is substantially cooled; when said internal combustion engine has been warmed up to a temperature above said first predetermined temperature but below said second predetermined temperature: said cooling fluid flowing through said head cooling jacket passes out of said cylinder head outlet and past said first junction assembly to flow down said main recirculation conduit system, through said radiator wherein it is cooled, down said radiator output conduit system, past said second junction assembly, and down said radiator output conduit system to said cylinder block inlet, while said cooling fluid flowing through said block cooling jacket passes out of said cylinder block outlet and past said first junction assembly to flow down said block recirculation conduit system, past said second junction assembly, and down said block recirculation conduit system to said cylinder block inlet, not being substantially cooled; and, after said internal combustion engine has been warmed up to a temperature above said second predetermined temperature, all of said cooling fluid flowing through said head cooling jacket and also all of said cooling fluid flowing through said block cooling jacket pass out of said cylinder head outlet and said cylinder block outlet respectively, then meet in said first junction assembly and both enter into said main recirculation conduit system, pass while mixing through said radiator wherein they are cooled, and then pass down said radiator output conduit system and diverge in said second junction assembly, said head jacket cooling fluid flow then continuing down said radiator output conduit system and passing to said cylinder head inlet, while said block jacket cooling fluid flow passes down said block recirculation conduit system to said cylinder block inlet, both of said cooling fluid flows therefore passing through said radiator so that both of them are substantially cooled.

Further, according to that previous proposal, there was also proposed a structure for said control valve, comprising: a valve casing formed with a first port, a second port, a third port, and a fourth port; a first valve element and a first valve seat cooperating with said first valve element so as to open and close a first controlled aperture through said first valve seat, said first controlled aperture being on a first fluid flow path between said first port and said third port and being the only controlled aperture thereon, and also being on a third fluid flow path between said second port and said third port; a second valve element and a second valve seat cooperating with said second valve element so as to open and close a second controlled aperture through said second valve seat, said second controlled aperture being on a second fluid flow path between said first port and said fourth port; a third valve element and a third valve seat cooperating with said third valve element so as to open and close a third controlled aperture through said third valve seat, said third controlled aperture being on said third fluid flow path between said second port and said third port, said first and third controlled apertures being the only controlled apertures on said third fluid flow path between said second port and said third port; a fourth valve element and a fourth valve seat cooperating with said fourth valve element so as to open and close a fourth controlled aperture through said fourth valve seat, said fourth controlled aperture being on a fourth fluid flow path between said second port and said fourth port and being the only controlled aperture thereon, and said fourth controlled aperture also being on said second fluid flow path between said first port and said fourth port, said second and fourth controlled apertures being the only controlled apertures on said second fluid flow path between said first port and said fourth port; a first temperature sensitive actuator exposed to sense the temperature near said second port or said fourth port, which, when it senses a temperature less than said first predetermined temperature, moves said first valve element so as to press said first valve element against said first valve seat and so as to close said first controlled aperture through said first valve seat, interrupting communication between said first port and said third port via said first fluid flow path and between said second port and said third port via said third fluid flow path, and moves said second valve element so as to bring said second valve element away from said second valve seat and so as to open said second controlled aperture through said second valve seat, partially establishing communication between said first port and said fourth port via said second fluid flow path; and when it senses a temperature higher than said first predetermined temperature, moves said first valve element so as to bring said first valve element away from said first valve seat and so as to open said first controlled aperture through said first valve seat, establishing communication between said first port and said third port via said first fluid flow path and partially establishing communication between said second port and said third port via said third fluid flow path, and moves said second valve element so as to press said second valve element against said second valve seat and so as to close said second controlled aperture through said second valve seat, interrupting communication between said first port and said fourth port via said second fluid flow path; a second temperature sensitive actuator exposed to sense the temperature near said second port or said fourth port, which, when it senses a temperature less than said second predetermined temperature, moves said third valve element so as to press said third valve element against said third valve seat and so as to close said third controlled aperture through said third valve seat, interrupting communication between said second port and said third port via said third flow path, and moves said fourth valve element so as to bring said fourth valve element away from said fourth valve seat and so as to open said fourth controlled aperture through said fourth valve seat, establishing communication between said second port and said fourth port via said fourth fluid flow path and partially establishing communication between said first port and said fourth port via said second fluid flow path; and when it senses a temperature higher than said second predetermined temperature, moves said third valve element so as to bring said third valve element away from said third valve seat and so as to open said third controlled aperture through said third valve seat, partially establishing communication between said second port and said third port via said third fluid flow path, and moves said fourth valve element so as to press said fourth valve element against said fourth valve seat and so as to close said fourth controlled aperture through said fourth valve seat, interrupting communication between said second port and said fourth port via said fourth fluid flow path and interrupting communication between said first port and said fourth port via said second fluid flow path.

This previously proposed structure for the control valve assembly was fairly good, but some difficulties tended to arise in practice, as follows. Because the type of control valve assembly outlined above, during its switching over period, did not particularly prevent the first valve element being moved away from the first valve seat before the second valve element had been seated against the second valve seat, thereby there was a possibility that the first port could be at once communicated to the second port and to the third port, at least for a certain transient time during the switching over of said control valve assembly. Now, with respect to the use of such a control valve assembly in a cooling system of the sort outlined above, this meant that there was a risk that, when control valve assembly transited from its operational condition in which it detected a temperature of the cooling fluid flow passing out of said block cooling jacket of less than said first predetermined temperature, to its operational condition in which it detected a temperature of the cooling fluid flow passing out of said block cooling jacket of greater than said first predetermined temperature, cold cooling fluid which had been in the upstream part of the main recirculation conduit system, or which had passed through the radiator and been cooled and had then passed through the cylinder head cooling jacket but still was rather cool, should be sucked into the upstream end of the block recirculation conduit system via the fourth port, before it was desirable to feed cooled cooling fluid into said block recirculation conduit system to cool the cylinder block. This rush of cold cooling fluid could in an extreme case cause a dangerous thermal shock to the cylinder block, thus damaging or destroying it; and in any case could severely adversely affect the operation of a heater which was being operated by using cooling fluid taken from the cylinder block cooling jacket or from the block recirculation conduit system for passing through it.

SUMMARY OF THE INVENTION

Therefore, a requirement was formulated for a fluid switchover valve with crossover protection; that is, for a fluid switchover valve by the operation of which a first space could be communicated alternatively with a second space or with a third space, and in the operation of which it was prevented that said first space should be at one and the same time substantially communicated with both said second space and said third space. Such a valve would have particular applicability to a cooling system of the sort outlined above, but could also be used for a wide range of other uses.

As a subsidiary requirement, it was also noticed, on consideration of the possibility of constructing such a fluid switchover valve, that a difficulty might arise if the first space were completely isolated from both the second space and the third space during switchover, even for a short time period. This occurrence might cause the stopping of fluid flow in the cylinder head cooling jacket of an internal combustion engine which was being cooled by using a cooling system of the type outlined above including such a fluid switchover valve, which of course might cause boiling of the cooling fluid in said cylinder head cooling jacket, or the generation of air locks or the like therein. Such a switchover time period, although transient, could in any case not be relied upon to be short. Accordingly, it was contemplated that it would be advantageous to provide such a fluid switchover valve with such crossover protection as outlined above, in which additionally during the switchover process a certain small degree of bypass communication was provided between the first space and the second space, independently of the main switchover action of the valve, in order to guard against total isolation of the first space from both the second space and the third space even for a short time. However, of course such bypass communication should not be substantially provided except during the switchover time period.

Further, of course, such a switchover valve should be suitable for use in a cooling system, which means that it should be cheap to make, reliable in service, and should incorporate no electrical control system or the like.

Accordingly, it is the primary object of the present invention to provide a valve for selectively connecting a first space to either a second space or a third space, in the switchover action of which the first space is substantially completely disconnected from the second space before being connected to the third space, and in the switchover action of which the first space is substantially completely disconnected from the third space before being connected to the second space.

It is a further object of the present invention to provide a valve as described above for selectively connecting a first space to either a second space or a third space, in which even for an instant, during the switchover action of the valve, the first space is not absolutely isolated completely from both of the second space and the third space.

It is a further object of the present invention to provide a valve as described above for selectively connecting a first space to either a second space or a third space, in which during the switchover operation of the valve the first space is vented to the second space via a small bypass port, in order to prevent total stagnation of fluid in the first space.

It is a further object of the present invention to provide a valve as described above for selectively connecting a first space to either a second space or a third space, in which said venting action of the first space to the second space is only effectively provided during switchover action.

It is a further object of the present invention to provide a valve as described above for selectively connecting a first space to either a second space or a third space, in which said venting action of the first space to the second space is totally stopped when the first space is definitely communicated to the third space, not during switchover action.

It is a further object of the present invention to provide a valve for selectively connecting a first space to either a second space or a third space, which responds to the temperature of the fluid in said third space.

It is a further object of the present invention to provide a valve for selectively connecting a first space to either a second space or a third space, which responds to the temperature of fluid in said third space, and not substantially to the temperature of fluid in said first space.

It is yet a further object of the present invention to provide such a valve for selectively connecting a first space to either a second space or a third space, which is suitable for use in a cooling system of the sort outlined above, and which when so used provides good protection against overheating of the cooling fluid in a head cooling jacket of a cylinder head.

It is yet a further object of the present invention to provide such a valve for selectively connecting a first space to either a second space or a third space, which is suitable for use in a cooling system of the sort outlined above, and which when so used provides good protection against vapor or air locking of the cooling fluid in a head cooling jacket of a cylinder head.

It is yet a further object of the present invention to provide such a valve for selectively connecting a first space to either a second space or a third space, which is suitable for use in a cooling system of the sort outlined above, and which when so used provides good protection against sudden thermal shock being given to a block cooling jacket of a cylinder block.

It is yet a further object of the present invention to provide such a valve for selectively connecting a first space to either a second space or a third space, which is suitable for use in a cooling system of the sort outlined above, and which when so used provides good protection against possible serious damage being caused to a block cooling jacket of a cylinder block.

It is yet a further object of the present invention to provide such a valve for selectively connecting a first space to either a second space or a third space, which is suitable for use in a cooling system of the sort outlined above, and which when so used provides good protection against poor operation of a heater fitted to operate by using heat provided by hot cooling fluid available in said cooling system.

It is yet a further object of the present invention to provide such a valve for selectively connecting a first space to either a second space or a third space, which is easy to service.

It is yet a further object of the present invention to provide such a valve for selectively connecting a first space to either a second space or a third space, which is cheap to manufacture.

It is yet a further object of the present invention to provide such a valve for selectively connecting a first space to either a second space or a third space, in which no electrical control system is employed.

It is yet a further object of the present invention to provide such a valve for selectively connecting a first space to either a second space or a third space, which is reliable during service.

According to the present invention, these and other objects are accomplished by a valve for controlling mutual communication between a first space, a second space, and a third space, comprising: a first valve seat and a first valve element which cooperates with said first valve seat by to and fro motion towards and away from said first valve seat so as to open and close a first controlled aperture through said first valve seat, said first controlled aperture being on a first fluid flow path between said first space and said second space; a second valve seat and a second valve element which cooperates with said second valve seat by to and fro motion towards and away from said second valve seat so as to open and close a second controlled aperture through said second valve seat, said second controlled aperture being on a second fluid flow path between said first space and said third space; a first means for biasing said first valve member in the direction away from said first valve seat; a second means for biasing said second valve member in the direction towards said second valve seat with a biasing force substantially greater than the biasing force exerted on said first valve element by said first biasing means; a temperature sensitive actuator which senses the temperature of fluid generally around and impinging upon it, comprising a first actuator member and a second actuator member, said temperature sensitive actuator as a whole being supported between said first actuator member bearing on said first valve element and said second actuator member bearing on said second valve element; said temperature sensitive actuator functioning so as, with rise in the temperature of said fluid generally therearound and impinging thereon, to move said first actuator member and said second actuator member with respect to one another in such mutual relative directions as to exert by said first actuator member a force on said first valve member in the direction to move said first valve members towards said first valve seat so as to close said first controlled aperture and so as to interrupt communication along said first fluid flow path between said first space and said second space, and to exert by said second actuator member an equal force on said second valve member in the direction to move said second valve member away from said second valve seat so as to open said second controlled aperture and so as to establish communication along said second fluid flow path between said first space and said third space.

According to such a structure, as said temperature of said fluid generally around and impinging upon said temperature sensitive actuator gradually rises, said first actuator member and said second actuator member are gradually moved with respect to one another in said mutual relative directions to a greater and greater extent; and thus first the biasing action of said second biasing means is gradually overcome so that gradually said second valve member moves towards said second valve seat, but the biasing action of said first biasing means which is substantially stronger than the biasing action of said second biasing means is not overcome, thus not moving said first valve member away from said first valve seat; and this action proceeds gradually until when said temperature of said fluid generally around and impinging upon said temperature sensitive actuator reaches approximately a predetermined temperature said second valve member is seated against said second valve seat so as to close said second controlled aperture and so as to interrupt communication along said second fluid flow path between said first space and said third space; and then subsequently, as said temperature of said fluid generally around and impinging upon said temperature sensitive actuator rises up beyond said predetermined temperature, because said second valve member is now seated against said second valve seat and cannot move further in the direction towards said second valve seat, the biasing action of said first biasing means is gradually overcome so that gradually said first valve member moves away from said first valve seat so as to open said first controlled aperture and so as to establish communication along said first fluid flow path between said first space and said second space; whereby communication along said second fluid flow path is definitely completely interrupted, before communication commences to be established along said first fluid flow path.

Further, according to a particular aspect of the present invention, these and other objects are more particularly and concretely accomplished by such a valve as described above, wherein said first valve element and said first valve seat and said second valve element and said second valve seat all lie generally in planes perpendicular to a certain axis, and said mutual relative movement of said first actuator member and said second actuator member occurs along said axis, said first valve element and said second valve element moving to and fro along said axis by the action of said temperature sensitive actuator so as to open and close said first controlled aperture and said second controlled aperture in cooperation with said first valve seat and said second valve seat and so as to establish and interrupt communication along said first fluid flow path between said first space and said second space and said second fluid flow path between said first space and said third space; said second space and said third space lying generally on opposite sides of said first space; and further, optionally, said mutual relative movement of said first actuator member and said second actuator member as said temperature sensed by said temperature sensitive actuator rises may be a movement of said first actuator member and said second actuator member along said axis away from one another, said first actuator member then exerting force on said first valve member so as to impel said first valve member, against the biasing action of said first biasing means, towards said first valve seat so as to close said first controlled aperture and so as to interrupt communication along said first fluid flow path between said first space and said second space, and said second actuator member then exerting force on said second valve member so as to impel said second valve member, against the biasing action of said second biasing means, away from said second valve seat so as to open said second controlled aperture and so as to establish communication along said second fluid flow path between said first space and said third space; and yet further, again optionally, said temperature sensitive actuator may comprise an outer casing, a quantity of thermally expandable material held within said outer casing, a needle member extending within said outer casing so that its inner end is communicated to said quantity of thermally expandable material and extending out of said outer casing in the direction away therefrom, and a needle guide member fixed with respect to said outer casing which is formed with a guide hole which closely slidably receives said needle member; one of said first actuator member and said second actuator member being one of said outer casing and said needle guide member, and the other being said needle member.

According to such a structure, when the temperature sensed by said actuator rises, said thermally expandable material expands, thus driving said needle member outwards through said guide hole in said needle guide member from the inside of said outer casing, so that said needle member impels one of said first valve element and said second valve element, the other one of said first valve element and said second valve element being impelled by either said casing or said needle guide member.

Further, according to a particular aspect of the present invention, these and other objects are more particularly and concretely accomplished by a valve of any of the sorts described above, further comprising a bypass valve port of relatively small cross sectional area which communicates between said first space and said third space and a bypass valve member which abuts against said bypass valve port, so as to close said bypass valve port, when said first valve member is to its fullest extent removed from said first valve seat, and which is removed from said bypass valve port, thus opening said bypass valve port, when said first valve member is moved towards said first valve seat from its said position wherein it is to its fullest extent removed from said first valve seat by any amount larger than a relatively small amount.

According to such a structure, during switching over action of said valve, said first space is never completely isolated, because said first space is at this time communicated to said second space via said bypass port.

Further, according to a particular aspect of the present invention, these and other objects are more particularly and concretely accomplished by a valve of the construction first specified above, wherein said second actuator member is said needle member and said first actuator member is one of said outer casing and said needle guide member; and wherein said needle member is abutted against the side of said second valve member towards said second valve seat; further comprising a bypass valve port of relatively small cross sectional area, formed through said second valve member, which communicates between said first space and said third space and a bypass valve member, mounted to said needle valve guide, which abuts against said bypass valve port, so as to close said bypass valve port, when said first valve member is to its fullest extent removed from said first valve seat and said needle valve guide is to its maximum extent approached towards said second valve member, and which is removed from said bypass valve port, thus opening said bypass valve port, when said first valve member is moved towards said first valve seat from its said position wherein it is to its fullest extent removed from said first valve seat by any amount larger than a relatively small amount, and said needle valve guide is moved away from said second valve member from its said position wherein it is to its maximum extent approached towards said second valve member by said amount larger than said relatively small amount.

According to such a structure, the closing of said bypass port is automatically performed when said temperature sensitive actuator is detecting a low temperature and accordingly said first space is being definitely communicated to said third space; but, during switching over action of the valve, said first space is never completely isolated, because said first space is at this time communicated to said second space via said bypass port.

Further, according to a particular aspect of the present invention, these and other objects are more particularly and concretely accomplished by such a valve as described above, wherein, when said needle valve guide is in its said position wherein it is to its maximum extent approached towards said second valve member, the outer end of said needle valve guide member remote from said outer casing of said temperature sensitive actuator abuts against the side of said second valve element towards said first space.

According to such a structure, this position wherein said needle valve guide is to the maximum extent approached towards said first valve member and said bypass valve member closes said bypass valve port is well defined, by said outer end of said needle valve guide then abutting against the side of said first valve element which faces towards said first space.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper space of the appended claims. In the drawings:

DESCRIPTION OF THE PREFERRED EMBODIMENTS

Figure 1:
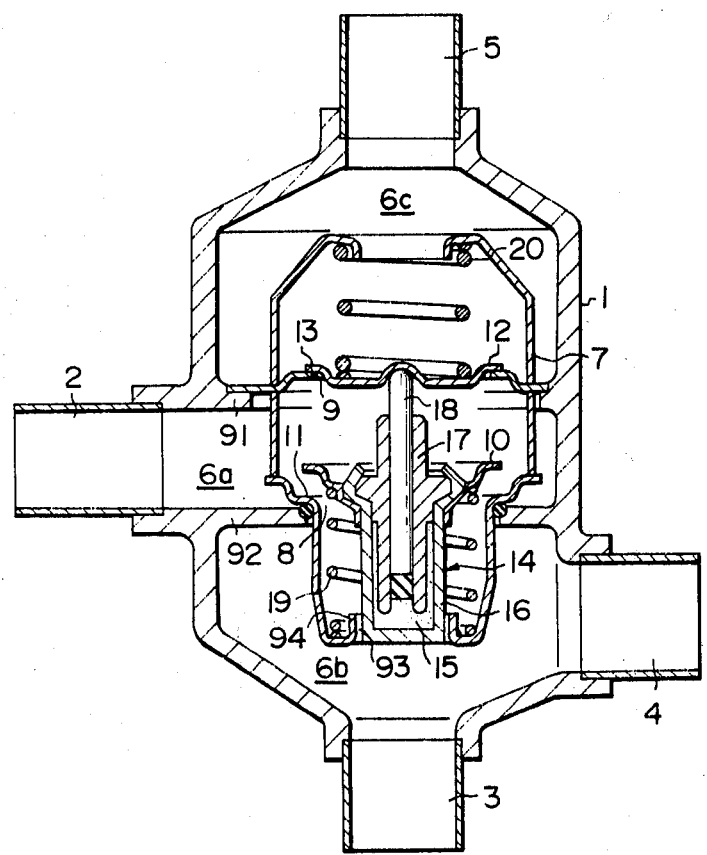
FIG. 1 is a sectional view showing a valve casing within which is fitted a valve which is a first preferred embodiment of the present invention, in which first preferred embodiment a first valve element is fitted around an intermediate portion of a temperature sensitive actuator outer casing.

The present invention will now be described with reference to several preferred embodiments thereof, and with reference to the appended drawings. FIG. 1 is a sectional view of the first preferred embodiment of the valve according to the present invention, shown as mounted in a valve casing 1, which in fact may be formed from several joined pieces. This valve casing 1 is formed with a first port 2, a second port 3, a third port 4, and a fourth port 5, which are formed as junction pipes extending outwards from the valve casing 1, so that this first preferred embodiment of the valve according to the present invention as a whole is easily detachable from the cooling system of a vehicle in which it is designed to be used for replacement, servicing, and the like. Within the valve casing 1 there are defined an upper chamber 6c, a middle chamber 6a, and a lower chamber 6b, all as seen in the sense of FIG. 1, the chambers 6a and 6c being separated by a first partition wall 91, which is formed with an aperture through it, and the chambers 6a and 6b being separated by a second partition wall 92, which is also formed with an aperture through it.

Within the valve casing 1 there is mounted the first preferred embodiment of the valve according to the present invention, in such a position as to control the aforesaid apertures through the first partition wall 91 and the second partition wall 92. The central axis of the aperture through the first partition wall 91 is roughly coincident, in this first preferred embodiment, with the central axis of the aperture through the second partition wall 92, and the partition walls 91 and 92 extend generally perpendicularly to said central axis. A valve frame 7 is fixed inside the valve casing 1 so as to block the apertures through said partition walls 91 and 92, and is formed of a generally hollow cylindrical form with openings through its sides (although these openings cannot in fact be seen in the figures), so that communication between the inside of the valve frame 7 and the outside thereof is freely established. The valve frame 7 passes through the middle chamber 6a, and one of its ends projects into the upper chamber 6c, while its other end projects into the lower chamber 6b. To the inner part of said valve frame 7 there are fixed as generally coaxial with the apertures through the first and second partition walls 91 and 92 two generally annular valve seats; a first annular valve seat 11 the circular opening through which opens between the middle chamber 6a and the lower chamber 6b, and which controls the aperture through said second partition wall 92; and a second annular valve seat 13 the circular opening through which opens between the upper chamber 6c and the middle 6a, and which controls the aperture through said first partition wall 91. Through the center of the first annular valve seat 11 there is formed a circular hole or first port 8, which when open provides a first fluid flow path between the middle chamber 6a and the lower chamber 6b; and through the center of the second annular valve seat 13 there is formed a circular hole or second port 9, which when open provides a second fluid flow path between the middle chamber 6a and the upper chamber 6c.

A first disk shaped valve element 10 cooperates with the first annular valve seat 11 so as selectively to establish and to break communication through said first port 8 between the middle chamber 6a and the lower chamber 6b; and a second disk shaped valve element 12 cooperates with the second annular valve seat 13 so as selectively to establish and break communication through said second port 9 between the upper chamber 6c and the middle chamber 6a. In this first preferred embodiment of the valve according to the present invention, the first valve element 10 is annular in form, and is fixed and sealed around an intermediate portion of an outer casing 16 of a temperature sensitive actuator 14, which is generally cylindrical in shape. The lower end as seen in FIG. 1 of this generally cylindrical casing 16 is slidably fitted through a guide hole 93, which is formed in the lowermost portion in the figure of the valve frame 7, and which is provided on its inner periphery with a short guide tube 94 for keeping the outer casing 16 straight and coaxial with the axis of the first and second valve seats 11 and 13, as said outer casing 16 moves upwards and downwards in the figure as will be seen later. This combination of the first valve element 10 and the outer casing 16 of the temperature sensitive actuator 14 is biased in the upward direction in FIG. 1 by a compression coil spring 19, the upper end of which in the figure bears against the lower surface of the first valve element 10, and the lower end of which in the figure bears against a lower portion of the valve frame 7 around the guide tube 94. Further, the second valve element 12 is biased in the downward direction in FIG. 1 by another compression coil spring 20, the lower end of which in the figure bears against the upper surface of the second valve element 12, and the upper end of which in the figure bears against an upper portion of the valve frame 7. Particularly according to an important feature of the present invention, the compression coil spring 20 is arranged to have a substantially stronger compression force than the compression coil spring 19.

Within the outer casing 16 of the temperature sensitive actuator 14 there is held a mass 15 of thermally expansible material such as so called thermowax. The outer casing 16 is as mentioned above formed in a generally cylindrical form, and its lower end in FIG. 1 is closed while its upper end is opened. This open upper end of the outer casing 16 is tightly fitted around a needle guide member 17 by crimping or the like, and the needle guide member 17, in this first preferred embodiment, projects somewhat upwards in FIG. 1 from the inside of the temperature sensitive actuator 14. Through the center of the needle guide member 17 along its axis there is formed a cylindrical hole which tightly slidingly receives a needle member 18 and forms a liquid seal around the outer surface of said needle member 18. Thus, the mass of thermally expansible material 15 is confined within the inside of the outer casing 16 of the temperature sensitive valve actuator 14, and is communicated to the lower end of the needle member 18. The needle member 18 is capable of movement in the up and down direction in FIG. 1 relative to the outer casing 16 of the temperature sensitive actuator 14 by sliding in said central hole through the needle guide member 17, and the upper end in the figure of the needle member 18 is pressed against a dimple formed in the lower surface of the second valve member 13.

The operation of this first preferred embodiment of the valve according to the present invention is as follows.

When the temperature of the cooling fluid within the lower chamber 6b swirling around the casing 16 of the temperature sensitive actuator 14 is below a predetermined temperature which for example in this first preferred embodiment may be 80° C., then the temperature of said mass of thermally expansible material 15 is also below said predetermined temperature, and at this time said mass of thermally expansible material 15 is a solid state and does not exert significant pressure on the lower end of the needle member 18, and therefore the needle member 18 is squeezed, by the biasing actions of the compression coil springs 19 and 20, deeply downwards with respect to the outer casing 16 of the temperature sensitive actuator 14, sliding downwards through the central hole through the needle guide member 17, so as to penetrate deeply within said temperature sensitive actuator 14; and, since as mentioned above the compression coil spring 20 has a substantially stronger compression force than does the compression coil spring 19 and overcomes it, the combination of the outer casing 16 of the temperature sensitive actuator 14 and the needle member 18 deeply embedded therein is positioned, by said outer casing 16 sliding through the guide tube 94, to its position in which it is shown in FIG. 1, wherein the first valve element 10 is moved away from the first valve seat 11 and opens the first port 8 therethrough thus establishing communication between the middle chamber 6a and the lower chamber 6b, i.e. opening said first port 8 and establishing communication along said first fluid flow path, and said second valve element 12 is seated against the second valve seat 13 and closes the second port 9 therethrough thus interrupting communication between the upper chamber 6c and the middle chamber 6a, i.e. closing said second port 9 and interrupting communication along said second fluid flow path.

On the other hand, when the temperature of the cooling fluid within the lower chamber 6b swirling around the casing 16 of the temperature sensitive actuator 14 rises above said predetermined temperature which for example in this first preferred embodiment has been taken as 80° C., then the temperature of said mass of thermally expansible material 15 also rises above said predetermined temperature, and at this time said mass of thermally expansible material 15 melts and comes to be in the liquid state and expands very substantially, thus progressively coming to exert significant pressure on the lower end of the needle member 18, and therefore the needle member 18 is progressively, along with the melting of the mass of thermally expansible material 15, driven out of the central hole formed in the needle guide member 17, i.e. is driven in the upward direction in FIG. 1 relative to the outer casing 16 of the temperature sensitive actuator 14, so as to increase the space available within said outer casing 16 to accommodate the melted thermally expansible material 15.

Now, as this driving of the needle member 18 upwards relative to the outer casing 16, i.e. this elongation in the vertical direction in FIG. 1 of the combination of the needle member 18 and the outer casing 16, continues progressively, it is clear that either the first valve element 10 and the outer casing 16 fixed thereto must move downwards in FIG. 1, or the second valve element 12 must move upwards in FIG. 1, in order to accommodate this elongation. In fact, because as mentioned above the compression coil spring 20 is substantially stronger and exerts a substantially greater compression force than the compression coil spring 19, first the first valve element 10 and the outer casing 16 fixed thereto will move downwards in FIG. 1 progressively against the compression force of the compression coil spring 19 which is overcome, without the second valve element 12 moving upwards in FIG. 1 against the compression force of the compression coil spring 20, until said first valve element 10 is firmly seated against the first valve seat 11 and the first port 8 is thereby closed thus interrupting communication between the middle chamber 6a and the lower chamber 6b via said first port 8, i.e. interrupting fluid flow along the first fluid flow path. During this process, the outer casing 16 slides through the guide tube 94 fixed in the guide hole 93 of the valve frame 7, and the needle member 18 is stationary relative to the valve frame 7. Then, only after this has occurred, and only after the first port 8 has been definitely closed, only then does the second valve element 12 start to move progressively upwards in FIG. 1 against the compression force of the compression coil spring 20 which is overcome, and therefore only then does said second valve element 12 start to move away from the second valve seat 13 and start to open the second port 9, thus establishing communication between the middle chamber 6a and the upper chamber 6c, i.e. only then is fluid flow along the second fluid flow path commenced to be established. During this process, the outer casing 16 of course does not slide through the guide tube 94 fixed in the guide hole 93 of the valve frame 7, but on the other hand the needle member 18 is not stationary relative to the valve frame 7, but moves upwards with respect thereto.

Thus, it is positively prevented, according to this first preferred embodiment of the valve according to the present invention, that both the first valve port 8 which communicates between the middle chamber 6a and the lower chamber 6b, and the second valve port 9 which communicates between the middle chamber 6a and the upper chamber 6c, should be opened at the same time; i.e., it is positively prevented that communication should be simultaneously established along the first fluid flow path between the middle chamber 6a and the lower chamber 6b and along the second fluid flow path between the middle chamber 6a and the upper chamber 6c. Thus it is positively prevented that any communication should ever be established between the upper chamber 6c and the lower chamber 6b; i.e., communication via the series combination of the first fluid flow path and the second fluid flow path is positively prevented.

On the other hand, when from this condition outlined above in which the temperature of the cooling fluid within the lower chamber 6b swirling around the casing 16 of the temperature sensitive actuator 14 is above said predetermined temperature which for example in this first preferred embodiment has been taken as 80° C., and then the temperature of said cooling fluid swirling around the casing 16 of the temperature sensitive actuator 14 drops below said predetermined temperature, then the temperature of said mass of thermally expansible material 15 also drops below said predetermined temperature, and at this time said mass of thermally expansible material 15 solidifies and comes to be in the solid state and contracts very substantially, thus coming to exert progressively less and less pressure on the lower end of the needle member 18, and therefore the needle member 18 is progressively, along with the solidifying of the mass of thermally expansible material 15, allowed to return into the central hole formed in the needle guide member 17, i.e. is allowed to move in the downward direction in FIG. 1 under the compression actions of the compression coil springs 19 and 20 relative to the outer casing 16 of the temperature sensitive actuator 14, so as to decrease the space available within said outer casing 16 in accordance with the decrease in volume of the solidifying thermally expansible material 15.

Now, as this driving of the needle member 18 downwards relative to the outer casing 16, i.e. this contraction in the vertical direction in FIG. 1 of the combination of the needle member 18 and the outer casing 16, continues progressively, it is clear that either the first valve element 10 and the outer casing 16 fixed thereto must move upwards in FIG. 1, or the second valve element 12 must move downwards in FIG. 1, under the compression actions of the compression coil springs 19 and 20, in order to follow this contraction. In fact, because as mentioned above the compression coil spring 20 is substantially stronger and exerts a substantially greater compression force than the compression coil spring 19, first the second valve element 12 moves progressively downwards in FIG. 1 under the compression force of the compression coil spring 20, towards the second valve seat 13, until said second valve element 12 reaches said second valve seat 13 and seats tightly thereagainst, thus closing the second port 9 therethrough and interrupting communication along the second fluid flow path, without the first valve element 10 moving upwards in FIG. 1 under the compression force of the compression coil spring 19. During this process, the outer casing 16 of course does not slide through the guide tube 94 fixed in the guide hole 93 of the valve frame 7, but on the other hand the needle member 18 is not stationary relative to the valve frame 7, but moves downwards with respect thereto. Then, only after this has occurred, and only after said second valve element 12 is firmly seated against the second valve seat 13, and the second port 9 has been definitely closed, only then does the first valve element 10 start to move progressively upwards in FIG. 1 according to the compression force of the compression coil spring 19, and therefore only then does said first valve element 10 start to move away from the first valve seat 11 and start to open the first port 8, thus establishing communication between the middle chamber 6a and the lower chamber 6b, i.e. only then is fluid flow along the second fluid flow path commenced to be established. During this process, the outer casing 16 slides upwards in the figure through the guide tube 94 fixed in the guide hole 93 of the valve frame 7, and the needle member 18 is stationary relative to the valve frame 7.

Thus, it is again positively prevented, according to this first preferred embodiment of the valve according to the present invention, that both the first valve port 8 which communicates between the middle chamber 6a and the lower chamber 6b, and the second valve port 9 which communicates between the middle chamber 6a and the upper chamber 6c, should be opened at the same time; i.e., it is positively prevented that communication should be simultaneously established along the first fluid flow path between the middle chamber 6a and the lower chamber 6b and along the second fluid flow path between the middle chamber 6a and the upper chamber 6c. Thus it is positively prevented that any communication should ever be established between the upper chamber 6c and the lower chamber 6b; i.e., again, communication via the series combination of the first fluid flow path and the second fluid flow path is positively prevented.

Figure 2:
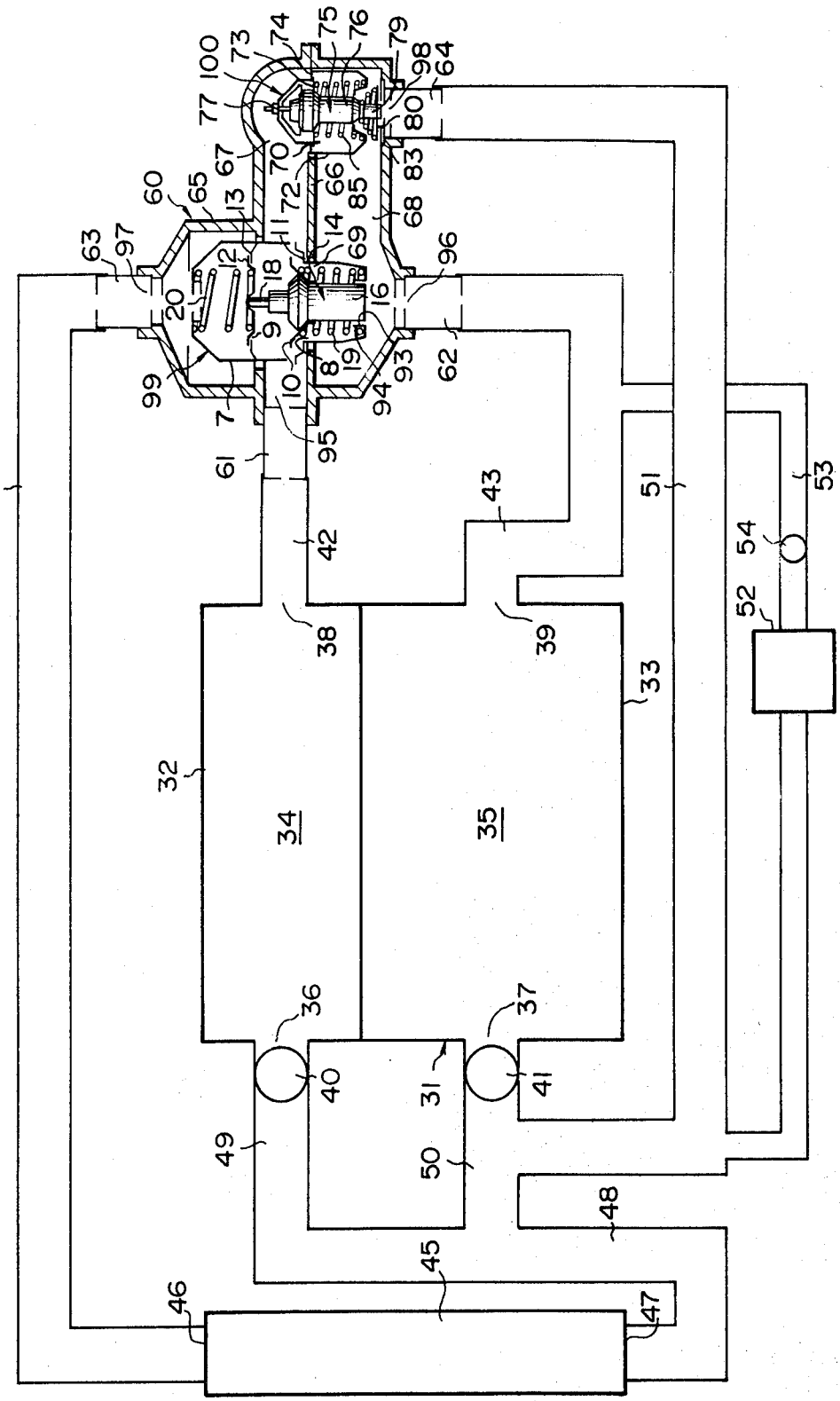
FIG. 2 is a diagrammatical view, showing an internal combustion engine and a cooling system thereof, said cooling system incorporating a control valve assembly which includes a valve according to the first preferred embodiment of the present invention shown in FIG. 1, and being of a type in which the control valve assembly is located proximate to the outlets of the cylinder head cooling jacket and the cylinder block cooling jacket.

In FIG. 2, this first preferred embodiment of the valve according to the present invention, shown in detail in FIG. 1, is shown as being used in a first cooling system for an internal combustion engine of a sort proposed in the above mentioned prior U.S. Pat. No. 4,370,950 made by the same applicant and assigned to the same assignee as the present application. In FIG. 2, parts and apertures shown (but not the chambers, or the valve casing or the inlet and outlet ports which are not part of the valve according to the present invention but are ancillary thereto), which correspond to parts and apertures of the first preferred embodiment of the valve according to the present invention shown in detail in FIG. 1, and which have the same functions, are designated by the same reference numerals and symbols as in that figure. In FIG. 2, which is a diagrammatical view, the reference numeral 31 denotes the internal combustion engine, which comprises a cylinder head 32 and a cylinder block 33, which are clamped together, optionally with the intervention therebetween of a cylinder head gasket which is not shown.

The internal combustion engine 31 includes at least one combustion chamber, which is not shown, and the cylinder head 32 defines the upper part of this combustion chamber, i.e. the part thereof in which the compression and the ignition occurs, and the surface of which upper part therefore receives the greater proportion of the heat generated in said combustion chamber. The cylinder head 32 is formed with a head cooling jacket 34 which extends close to a large part of said upper part of said combustion chamber, so as, when said head cooling jacket 4 is filled with cooling fluid such as water, to cool said upper part of said combustion chamber, and said cylinder head 32. Typically, the internal combustion engine 31 will in fact include several such combustion chambers, and the head cooling jacket 34 will extend past the upper parts of each of these combustion chambers. Cooling fluid is supplied into the head cooling jacket 34 through a cylinder head inlet 36, and is taken out from the head cooling jacket 34 through a cylinder head outlet 38.

Similarly, the cylinder block 33 is formed with a block cooling jacket 35 which extends close to a large part of the side wall defining surface of said combustion chamber, so as, when said block cooling jacket 35 is filled with cooling fluid, to cool said side wall part of said combustion chamber, and said cylinder block 33. Again, of course, typically the cylinder block 33 will in fact define several such combustion chamber walls or bores, and the block cooling jacekt 35 will extend past the side wall parts of each of these bores. Cooling fluid is supplied into the block cooling jacket 35 through a cylinder block inlet 37, and is taken out from the block cooling jacket 35 through a cylinder block outlet 39.

Further, a cooling radiator 45 of a conventional sort, formed with an inlet 46 positioned at an upper portion thereof and an outlet 47 positioned at a lower portion thereof, is provided for the internal combustion engine 31.

As has been previously explained, during operation of the internal combustion engine 31, the major portion of the heat generated in the combustion chambers thereof is communicated to the cylinder head 32, and only a minor portion of the heat generated in the combustion chambers is communicated directly to the cylinder block 33 of the internal combustion engine 31. Therefore, an imbalance of heating occurs between the cylinder head 32 and the cylinder block 33, and a cooling system, which uses the above explained first embodiment of the valve according to the present invention, for cooling the internal combustion engine 31, and which corrects said imbalance, will now be explained.

A cylinder head pump 40 is provided proximate to the cylinder head inlet 36, for impelling cooling fluid through the head cooling jacket 34 from the cylinder head inlet 36 to the cylinder head outlet 38; and, similarly, a cylinder block pump 41 is provided, proximate to the cylinder block inlet 37, for impelling cooling fluid through the block cooling jacket 35 from the cylinder block inlet 37 to the cylinder block outlet 39. To the cylinder head outlet 38 there is connected the upstream end of a head output conduit 42, and to the cylinder block outlet 39 there is connected the upstream end of a block output conduit 43.

The downstream end, i.e. the end remote from the internal combustion engine 31, of the head output conduit 42 is connected to the upstream end of a first union pipe 61, the downstream end of which is connected to a first port 95 of a valve assembly 60 which will be explained in detail later. The downstream end, i.e. the end remote from the internal combustion engine 31, of the block output conduit 43 is connected to the upstream end of a second union pipe 62, the downstream end of which is connected to a second inlet port 96 of said valve assembly 60. A first outlet port 97 of said valve assembly 60 is connected to the upstream end of a third union pipe 63, the downstream end of which is connected to the upstream end of a main recirculation conduit 44. Finally, a second outlet port 98 of said valve assembly 60 is connected to the upstream end of a fourth union pipe 64, the downstream end of which is connected to the upstream end of a block recirculation conduit 51.

The downstream end of said main recirculation conduit 44 is connected to the inlet 46 of the radiator 45, and the outlet 47 of the radiator 45 is connected to the upstream end of a radiator output conduit 48, whose downstream end is connected to the upstream end of a head input conduit 49 and also is connected to the upstream end of a block input conduit 50. The downstream end of the head input conduit 49 is directly connected to the input of the cylinder head pump 40, and the downstream end of the block input conduit 50 is connected to the input of the cylinder block pump 41.

To an intermediate point of the block output conduit 43 there is connected the upstream end of a heater feed conduit 53, at an intermediate point of which there is provided a heater flow regulation valve 54, which selectively can regulate the flow rate of cooling fluid through said heater feed conduit 53; downstream of the heater flow regulation valve 54 in the heater feed conduit 53 there is provided a heater 52; and the downstream end of the heater feed conduit 53 is connected to an intermediate point of the block recirculation conduit 51. Thus the heater 52 can be fed, via the heater feed conduit 53, with part of the cooling fluid flow which is available in the block output conduit 43, in a selective manner under the control of the heater regulation valve 54. Finally, the downstream end of the block recirculation conduit 51 is connected to an intermediate part of the block input conduit 50, and accordingly the block recirculation conduit 51, via the valve assembly 60 as will be seen hereinafter, can communicate the cylinder block outlet 39 to the inlet of the cylinder block pump 41, bypassing the radiator 45.

Now, the particular construction of the valve assembly 60 which includes this first preferred embodiment of the valve according to the present invention, and which in the cooling system shown in FIG. 2, will be explained in detail. In FIG. 2 there may be seen a cross sectional view of said valve assembly 60, and of said first preferred embodiment of the valve according to the present invention which is here used as a first control valve and is denoted by the reference numeral 99 and is incorporated in said valve assembly 60, as well as a sectional view of a second control valve 100 of a prior art sort which is also incorporated in said valve assembly 60.

This valve assembly 60 comprises a valve assembly casing 65, which in fact may be formed from several joined pieces. This valve assembly casing 65 is formed with a first inlet port 95, a second inlet port 96, a first outlet port 97, and a second outlet port 98, which respectively are connected to the first, second, third, and fourth union pipes 61, 62, 63, and 64, already mentioned, so that the valve assembly 60 as a whole is easily detachable from the cooling system of the vehicle for replacement, servicing, and the like. Within the valve assembly casing 65 there are defined an upper chamber 67 and a lower chamber 68, both as seen in the sense of FIG. 2, these chambers 67 and 68 being separated by a partition wall 66, which is formed with a first communication port 69 and a second communication port 70 pierced through it. The opening and closing of the first communication port 69, which communicates the upper chamber 67 and the lower chamber 68, and of the first outlet port 97, are regulated, as will be seen in detail shortly, by the action of the aforementioned first control valve 99; and the opening and closing of the second communication port 70, which also communicates the upper chamber 67 and the lower chamber 68, and of the second outlet port 98, are regulated, as will also be seen in detail shortly, by the action of the aforementioned second control valve 100. The central axis of the first communication port 69 is coincident with the central axis of the first outlet port 97, and the central axis of the second communication port 70 is coincident with the central axis of the second outlet port 98.

The construction of the first control valve 99 which controls the opening and closing of the first communication port 69 and of the first outlet port 97 will not be described, because it is identical to the construction of the valve shown in FIG. 1 which is the first preferred embodiment of the present invention. As mentioned above, the parts of the first control valve 99 are designated by the same reference numerals as the parts of the valve shown in FIG. 1 which correspond thereto. On the other hand, now the construction of the second control valve 100 which controls the opening and closing of the second communication port 70 and of the second outlet port 98, which is identical to a second control valve described in the above identified prior art U.S. Pat. No. 4,370,950 made by the same applicant as the present application, will be described. A valve frame 72 is fixed within the valve casing 65 so as to block the second communication port 70, but, in the case of this second control valve 100, not to block any inner part of the second outlet port 98. This valve frame 72 is again of a generally hollow cylindrical form with openings formed through its sides (although again these openings cannot in fact be seen in the figures) so that communication between the inside of the valve frame 72 and the outside thereof is freely established. To the inner part of said valve frame 72 there is fixed as generally coaxial with the second communication port 70 and the second outlet port 98 a generally annular first valve seat 74, the circular opening through which opens between the upper chamber 67 and the lower chamber 68, and there is formed around an inner part of the second outlet port 98 a second annular valve seat 83 the circular opening through which opens between the lower chamber 68 and the second outlet port 98.

A first annular valve element 73 cooperates with the first annular valve seat 74 so as selectively to establish and to break communication between the upper chamber 67 and the lower chamber 68, and a second disk shaped valve element 80 cooperates with the second annular valve seat 83 so as selectively to establish and break communication between the lower chamber 68 and the second outlet port 98. In this shown cooling system, this first annular valve element 73 is fixed around the outside of the outer shell 76 of a temperature sensitive valve actuator generally designated by the reference numeral 75, as generally coaxial with the second communication port 70 and the second outlet port 98, so as to seal against said outside of said outer shell 76. To the lower end in FIG. 2 of this outer shell 76 of this temperature sensitive valve actuator 75 there is fixed the upper end of a valve shaft 79, to the lower end of which there is slidably mounted, also as generally coaxial with the second communication port 70 and the second outlet port 98, said second disk shaped valve element 80; and said second disk shaped valve element 80 is biased in the downward direction in FIG. 2, relative to the valve shaft 79, by a compression coil spring, movement of said disk shaped valve element 80 downwards in FIG. 2 along the valve shaft 79 being finally arrested by it coming into contact with a snap ring fitted on the valve shaft 79. Thus, in this construction, the first and second valve elements 73 and 80, the outer shell 76 of the temperature sensitive valve actuator 75, and the valve shaft 79 are all fixed together, and move together, provided that the second disk shaped valve element 80 is not displaced from its extreme position downwards in the figure along said valve shaft 79 wherein it rests against the snap ring by compressing the compression coil spring. This combination of the first and second valve elements 73 and 80, the outer shell 76 of the temperature sensitive valve actuator 75, and the valve shaft 79 is biased in the upward direction in FIG. 2 by a compression coil spring 85, the lower end of which bears against a part of the valve frame 72.

Thus the lower part of the outer shell 76 of the temperature sensitive valve actuator 75 is located in the lower part in FIG. 2 of the valve frame 72, within the lower chamber 68, and within this lower part of the outer shell 76 there is held a mass of thermally expansible material such as so called thermowax, the melting point of which as will be seen hereinafter is substantially higher than the melting point of the mass 15 of thermally expansible material in the first control valve 99. This mass of thermally expansible material is sealed within the inside of the temperature sensitive valve actuator 75, and is communicated to the lower end in FIG. 2 of a valve needle 77, the upper part of which in FIG. 2 extends through and is guided by a guide member which is incorporated in the temperature sensitive valve actuator 75. Finally, the upper end in FIG. 2 of the valve needle 77 is fixed to the upper part of the valve frame 72 by an adjustable screw system, which is visible in the drawing but which will not be particularly described here, and which is used for adjustment purposes.

The operation of this second control valve 100 is as follows. When the temperature of the cooling fluid within the lower chamber 68 is below a predetermined second temperature which for example in this first preferred embodiment may be 95° C., and which in any case is substantially higher than the predetermined temperature, exemplarily 80° C., which is the melting point of the mass 15 of thermally expansible material in the first control valve 99 (which henceforward in this specification will be termed the first predetermined temperature), then the temperature of said mass of thermally expansible material in said second control valve 100 is also below said predetermined second temperature, and at this time said mass of thermally expansible material is in a solid state and does not exert significant pressure on the lower end of the valve needle 77, and therefore the outer shell 76 of the temperature sensitive valve actuator 75, the first valve element 73, the valve shaft 79, and the second valve element 80 are positioned, by the biasing action of the compression coil spring 85, to their upper positions in which they are shown in FIG. 2, wherein the first valve element 73 is seated against the first valve seat 74 and closes the circular hole therethrough thus breaking communication between the upper chamber 67 and the lower chamber 68, i.e. blocking said second communication port 70, and wherein the second valve element 80 is moved away from the second valve seat 83 and opens the circular hole therethrough thus establishing communication between the lower chamber 68 and the second outlet port 98, i.e. opening said second outlet port 98. On the other hand, when the temperature of the cooling fluid within the lower chamber 68 rises above said predetermined second temperature which for example in this first preferred embodiment has been taken as 95° C., then the temperature of said mass of thermally expansible material in said second control valve 100 also rises above said predetermined second temperature, and at this time said mass of thermally expansible material melts and comes to be in the liquid state and expands very substantially, thus coming to exert significant pressure on the lower end of the valve needle 77 (not visible in the figure), and therefore the outer shell 76 of the temperature sensitive valve actuator 75, the first valve element 73, the valve shaft 79, and the second valve element 80 are now positioned, against the biasing action of the compression coil spring 85 which is overcome, to their lower positions in the sense of FIG. 2, wherein the first valve element 73 is moved away from the first valve seat 74 and opens the circular hole therethrough thus establishing communication between the upper chamber 67 and the lower chamber 68, i.e. opening said second communication port 70, and wherein the second valve element 80 is seated against the second valve seat 83 and closes the circular hole therethrough thus breaking communication between the lower chamber 68 and the second outlet port 98, i.e. closing said second outlet port 98. During this downward positioning action, if and when the force exerted by the mass of thermally expansible material becomes sufficiently great, and if the second valve element 80 contacts the second valve seat 83 substantially before the first valve element 73 contacts the first valve seat 74, then the second valve element 80 will be driven away from the snap ring 62 upwards in the sense of FIG. 2 relative to the valve shaft 79 against the biasing action of the compression coil spring 61 which is overcome; but this will make substantially no difference to the action of the second control valve 100.

Now, the operation of the cooling system and the first preferred embodiment of the valve according to the present invention described above will be explained.

First, if the cooling fluid passing out from the cylinder block outlet 39 is at less than the first predetermined temperature value, which has been taken exemplarily as 80° C., then it is considered, according to the operation of this first preferred embodiment of the cooling system and valve according to the present invention, that the internal combustion engine 1 is being warmed up from the cold condition. At this time, the valve assembly 60 is in the state shown in FIG. 2.

That is to say, the temperature of said mass of thermally expansible material 15 in the first control valve 99 is also below said predetermined first temperature of 80° C. (since said mass of thermally expansible material 15 is at substantially the same temperature as is the outer casing 16 of the temperature sensitive actuator 14, and this outer casing 16 is largely within the lower chamber 68 and accordingly is at substantially the same temperature as the cooling fluid therein), and thus at this time said mass of thermally expansible material 15 is in a solid state and does not exert significant pressure on the lower end of the needle member 18; and therefore the needle member 18 and the second valve element 12 which abuts against the end of said needle member 18 are biased by the biasing action of the stronger compression coil spring 20 to their lowermost positions in the sense of FIG. 2, wherein said second valve element 12 is seated against the second valve seat 13 and closes the circular hole 9 therethrough thus breaking communication between the upper chamber 67 and the first outlet port 97, i.e. blocking first said outlet port 97. Further, the outer casing 16 of the temperature sensitive actuator 14 and the first valve element 10 fixed thereto are positioned, by the biasing action of the weaker compression coil spring 19, to their uppermost positions in the sense of FIG. 2, wherein the first valve element 10 is moved away from the first valve seat 11 and opens the circular hole 8 therethrough thus establishing communication between the upper chamber 67 and the lower chamber 68, i.e. opening said first communication port 69. Thus, in this operational condition, the first inlet port 95 is put out of communication from the first outlet port 97, but is communicated with the lower chamber 68.

Further, the temperature of the cooling fluid within the lower chamber 68 is of course below said predetermined second value, which has been taken exemplarily as 95° C., and thus the temperature of the mass of thermally expansible material in the second control valve 100 is also below said predetermined second temperature and at this time said mass of thermally expansible material is in a solid state and does not exert significant pressure on the lower end of the valve needle 77, and therefore the outer shell 76 of the temperature sensitive valve actuator 75, the first valve element 73, the valve shaft 79, and the second valve element 80 are positioned, by the biasing action of the compression coil spring 85, to their upper positions in which they are shown in FIG. 2, wherein the first valve element 73 is seated against the first valve seat 74 and closes the circular hole therethrough thus breaking communication between the upper chamber 67 and the lower chamber 68, i.e. blocking said second communication port 70, and wherein the second valve element 80 is moved away from the second valve seat 83 and opens the circular hole therethrough thus establishing communication between the lower chamber 68 and the second outlet port 98, i.e. opening said second outlet port 98. Thus, the second outlet port 98 is communicated with the lower chamber 68.

Accordingly, in this operational state, since the first outlet port 97 is kept completely closed, no fluid flow can occur at this time through the main recirculation conduit 44, the radiator 45, and the radiator output conduit 48. Therefore, the flow of cooling fluid from the cylinder head outlet 38 enters into the upper chamber 67 of the valve assembly 60 through the first inlet port 95, whence it passes through the first communication port 69 entirely into the lower chamber 68, wherein it meets the flow of cooling fluid which is passed out from the cylinder block outlet 39 through the second inlet port 96 into said lower chamber 68. These flows of cooling fluid thus flow together through the lower chamber 68, out of the second outlet port 98 which is open as stated above, along the block recirculation conduit 51, mixing therein with one another, and then flow into the intermediate portion of the block input conduit 50 to which the downstream end of the block recirculation conduit 51 is communicated. Therefrom, a part of this cooling fluid is supplied to the inlet side of the cylinder block pump 41, and also a part of this cooling fluid flows through the block input conduit 50 in the right to left direction in the figure to be supplied to the upstream end of the head input conduit 49 via the downstream portion of the radiator output conduit 48 remote from the radiator 45. From the head input conduit 49, this flow then is supplied to the inlet side of the cylinder head pump 40, which pumps it back into the head cooling jacket 34 of the cylinder head 32.

Of course, at this time, substantially no cooling action at all is provided in this mode of operation by the cooling system and valve according to the present invention to the internal combustion engine 31 as a whole, because the radiator 45 is receiving no flow of cooling fluid; and the operation of the shown cooling system and the first preferred embodiment of the valve according to the present invention is only to redistribute heat which is being produced by combustion within the combustion chambers of the internal combustion engine 31 from the cylinder head 32 thereof, which directly receives most of the generated heat, to the cylinder block 33 thereof which directly receives only a minor part of the generated heat.

As a result of the above explained mode of operation, the warming up characteristic of the cylinder block 33 is much improved, as compared with the conventional case in which the cooling system for the cylinder head 32 is entirely separated from the cooling system for the cylinder block 33. Since it is desirable to raise the temperature of the cylinder block 33 fairly quickly from the cold condition, in order to minimize frictional losses during the warming up process of the internal combustion engine by heating up the lubricating oil contained within it as quickly as possible, and also in order to minimize fuel utilization during engine warmup, and in order to minimize engine wear, especially cylinder bore wear, before the engine block is fairly hot, as explained above, as well as to minimize the emission of noxious components in the exhaust gases of the engine when it is being operated in the cold condition, the above described construction according to the first preferred embodiment of the cooling system and valve according to the present invention is very advantageous.

Further, the time for the cooling fluid which passes through the heater 52 to become hot and for the heater 52 to provide heating for the passenger compartment (not shown) of the vehicle to which the internal combustion engine 31 is fitted, if the heater flow regulation valve 54 is opened and flow of cooling fluid is occurring in the heater feed conduit 53, is the same as in the case of a conventional cooling system in which the cylinder head and the cylinder block are cooled together by one cooling fluid flow circuit, and is substantially less than in the case of a cooling system in which the cylinder head is cooled completely separately from the cylinder block.

On the other hand, if the cooling fluid passing out from the cylinder block outlet 39 is at higher than the first predetermined temperature value, which has been taken exemplarily as 80° C., then it is considered, according to the operation of this cooling system and the shown first preferred embodiment of the valve according to the present invention, that the internal combustion engine 31 is fully warmed up from the cold condition. Suppose further for the time being that said cooling fluid passing out from the cylinder block outlet 39 is at a temperature lower than the second predetermined temperature value, which has been taken exemplarily as 95° C. At this time, the valve assembly 60 is in the state which will now be described.

The temperature of the mass of thermally expansible material 15 in the first control valve 99 is of course now also above said predetermined first temperature of 80° C. (since as remarked above said mass of thermally expansible material 15 is at substantially the same temperature as is the outer casing 16 of the temperature sensitive actuator 14, and this outer casing 16 is largely within the lower chamber 68 and accordingly is at substantially the same temperature as the cooling fluid therein), and thus at this time said mass of thermally expansible material 15 is melted and is in the liquid state and has expanded very substantially as compared to its volume in the solid state, thus coming to exert significant pressure on the lower end of the needle member 18; and therefore the needle member 18 and the second valve element 12 which abuts against the end of said needle member 18 are now forcibly positioned by the elongation in length of the temperature sensitive actuator 14, against the biasing action of the stronger compression coil spring 20 which is overcome, to their uppermost positions in the sense of FIG. 2, wherein said second valve element 12 is moved away from the second valve seat 13 and opens the circular hole 9 therethrough thus establishing communication between the upper chamber 67 and the first outlet port 97, i.e. opening said first outlet port 97. Further, the outer casing 16 of the temperature sensitive actuator 14 and the first valve element 10 fixed thereto are positioned, against the biasing action of the weaker compression coil spring 19 which is also overcome, to their lowermost positions in the sense of FIG. 2, wherein the first valve element 10 is pushed against the first valve seat 11 and closes the circular hole 8 therethrough thus breaking communication between the upper chamber 67 and the lower chamber 68, i.e. closing said first communication port 69. Thus, in this operational condition, the first inlet port 95 is communicated with the first outlet port 97, but is put out of communication from the lower chamber 68.

During the transition between the previously described operational state, wherein the temperature of the cooling fluid within the lower chamber 68 was less than the first predetermined temperature which has exemplarily been taken as 80° C., and this operational state, wherein the temperature of the cooling fluid within the lower chamber 68 is higher than said first predetermined temperature, i.e. during the time when the mass of thermally expansible material 15 is melting so as to become in the liquid state and is expanding very substantially as compared to its volume in the solid state, as explained above with relation to the functioning of the first embodiment of the valve according to the present invention, because the first valve element 10 becomes firmly seated against the first valve seat 11 and closes the first communication port 69 before the second valve element 12 starts to be moved away from the second valve seat 13 and starts to open the first outlet port 97, therefore it does not occur even for a short transient time (this time, if it existed at all, might not in fact be short) that both the first aperture 8 and the second aperture 9 are open together, i.e. that the first outlet port 97 is communicated via the upper chamber 67 to the lower chamber 68. Thus, during this transition, it is positively forbidden that cooling fluid which is at a low temperature, having been cooled by the radiator 45 or having come from the upstream end of the main recirculation conduit 44 and thus being quite cold, is sucked into the upper end of the block recirculation conduit 51 and passes down said block recirculation conduit 51 to enter into the block cooling jacket 35 by way of the cylinder block pump 41. This therefore avoids that the temperature of the cooling fluid which is passing through the block cooling jacket 35 temporarily should drop down, which minimizes thermal shock to the cylinder block 33 and also ensures that the heater 52 does not suffer a deterioration in function, even for a brief time period.

Further, since the temperature of the cooling fluid within the lower chamber 68 is below said predetermined second temperature which has been exemplarily taken as 95° C., therefore the temperature of said mass of thermally expansible material in the second control valve 100 is of course also below said predetermined second temperature, and thus at this time said mass of thermally expansible material is in a solid state and does not exert significant pressure on the lower end of the valve needle 77, and therefore the outer shell 76 of the temperature sensitive valve actuator 75, the first valve element 73, the valve shaft 79, and the second valve element 80 are positioned, by the biasing action of the compression coil spring 85, to their upper positions in which they are shown in FIG. 2, wherein the first valve element 73 is seated against the first valve seat 74 and closes the circular hole therethrough thus breaking communication between the upper chamber 67 and the lower chamber 68, i.e. blocking said second communication port 70, and wherein the second valve element 80 is moved away from the second valve seat 83 and opens the circular hole therethrough thus establishing communication between the lower chamber 68 and the second outlet port 98, i.e. opening said second outlet port 98.

Accordingly, in this operational state, since the first communication port 69 and also the second communication port 70 are both kept completely closed, no mixing can occur between the flow of cooling fluid that is passing out of the cylinder head cooling jacket 34 through the cylinder head outlet 38 to pass into the upper chamber 67 of the valve assembly 60 through the first inlet port 95 and the flow of cooling fluid that is passing out of the cylinder block cooling jacket 34 through the cylinder block outlet 39 to pass into the lower chamber 68 of the valve assembly 60 through the second inlet port 96.

Thus, the flow of cooling fluid which has passed through the head cooling jacket 34 and has been heated therein flows out from the cylinder head outlet 38 and enters into the upper chamber 67 of the valve assembly 30 through the first inlet port 95, whence it passes through the first outlet port 97 which as mentioned above is open, into the main recirculation conduit 44 to flow down to its downstream end, whence it enters into the inlet 46 of the radiator 45. This flow of cooling fluid is then cooled within the radiator 45 in a per se well known fashion, and passes out of the outlet 47 of the radiator 45 into the upstream end of the radiator output conduit 48, along which it flows, and from the downstream end of which it passes into the upstream end of the head input conduit 49. Then, this cooling fluid passes through the head input conduit 49 to be supplied to the inlet of the cylinder head pump 40, which pumps it into the cylinder head inlet 36, whence it is returned to the head cooling jacket 34.

On the other hand, the flow of cooling fluid which has passed through the block cooling jacket 35 and has been heated therein flows out from the cylinder block outlet 39 and enters into the lower chamber 68 of the valve assembly 60 through the second inlet port 96, whence it passes through the second outlet port 98 which as mentioned above is open, into the block recirculation conduit 51 to flow down to its downstream end, whence it enters into the upstream end of the block input conduit 50. Then, this cooling fluid passes through the block input conduit 50 to be supplied to the inlet of the cylinder block pump 41, which pumps it into the cylinder block inlet 37, whence it is returned to the block cooling jacket 35.

Of course, at this time, substantially no cooling action at all is provided in this mode of operation by the shown cooling system and the first preferred embodiment of the valve according to the present invention to the cylinder block 33, because the cylinder block 33 is receiving no flow of cooling fluid which has passed through the radiator 45; and the operation of the shown cooling system and the first preferred embodiment of the valve according to the present invention is only to cool the cylinder head 32 of the internal combustion engine 31, which directly receives most of the generated heat, by using the maximum cooling capacity of the radiator 45, but not to cool the cylinder block 33 which directly receives only a minor part of the generated heat.

Suppose now, on the other hand, that said cooling fluid passing out from the cylinder block outlet 39 comes to be at a higher temperature than the second predetermined temperature value, which has been taken exemplarily as 95° C. At this time, the valve assembly 60 transits to the state which will now be described.

The temperature of the mass of thermally expansible material 15 in the first control valve 99 of course remains above the predetermined first temperature of 80° C., and thus at this time said mass of thermally expansible material 15 remains melted and in the liquid state as expanded very substantially as compared to its solid state, thus continuing to exert significant pressure on the lower end of the needle member 18; and therefore the needle member 18 and the second valve element 12 which abuts against the end of said needle member 18 continue to be positioned by the elongation in length of the temperature sensitive actuator 14 against the biasing action of the stronger compression coil spring 20 which is overcome to their uppermost positions in the sense of FIG. 2, wherein said second valve element 12 is moved away from the second valve seat 13 and opens the circular hole 9 therethrough thus establishing communication between the upper chamber 67 and the first outlet port 97, i.e. opening said first outlet port 97. Further, the outer casing 16 of the temperature sensitive actuator 14 and the first valve element 10 fixed thereto continue to be positioned, against the biasing action of the weaker compression coil spring 19 which is also overcome, to their lowermost positions in the sense of FIG. 2, wherein the first valve element 10 is pushed against the first valve seat 11 and closes the circular hole 8 therethrough thus breaking communication between the upper chamber 67 and the lower chamber 68, i.e. closing said first communication port 69. Thus, in this operational condition, the first inlet port 95 continues to be communicated with the first outlet port 97, and continues to be put out of communication from the lower chamber 68.

However, since the temperature of the cooling fluid within the lower chamber 68 now has come to be above said predetermined second temperature which has been exemplarily taken as 95° C., therefore the temperature of said mass of thermally expansible material in the second control valve 100 is of course also now above said predetermined second temperature of 95° C., and thus at this time said mass of thermally expansible material has melted and has come to be in the liquid state and has expanded very substantially, and thus has come to exert significant pressure on the lower end of the valve needle 77, and therefore the outer shell 76 of the temperature sensitive valve actuator 75, the first valve element 73, the valve shaft 79, and the second valve element 80 are now positioned, against the biasing action of the compression coil spring 85 which is overcome, to their lower positions in the sense of FIG. 2, wherein the first valve element 73 is moved away from the first valve seat 74 and opens the circular hole therethrough thus establishing communication between the upper chamber 67 and the lower chamber 68, i.e. opening said second communication port 70, and wherein the second valve element 80 is seated against the second valve seat 83 and closes the circular hole therethrough thus breaking communication between the upper chamber 67 and the lower chamber 68, i.e. closing said second outlet port 98. As mentioned before, during this downward positioning action, if the second valve element 80 contacts the second valve seat 83 substantially before the first valve element 73 contacts the first valve seat 74, and when the force exerted by the mass of thermally expansible material becomes sufficiently great, then the second valve element 80 will be driven away from its snap ring upwards in the sense of FIG. 2 relative to the valve shaft 79 against the biasing action of its compression coil spring which is overcome; but this will make substantially no difference to the action of the second control valve 100. In this operational state, since the second outlet port 98 is now completely closed, no flow of cooling fluid can take place through the block recirculation conduit 51.

Thus, the flow of cooling fluid which has passed through the block cooling jacket 35 and has been heated therein flows out from the cylinder block outlet 39 and enters into the lower chamber 68 of the valve assembly 60 through the second inlet port 96, whence it passes through the second communication port 70 which as mentioned above is now open, into the upper chamber 67, wherein it mixes with the flow of cooling fluid which has passed through the head cooling jacket 34 and has been heated therein and has flowed out from the cylinder head outlet 38 and has entered said upper chamber 67 through the first inlet port 37. These two mixed flows then pass through the first outlet port 97 which as mentioned above is now open at this time, to enter the upstream end of the main recirculation conduit 44 and to flow down to its downstream end while becoming thoroughly mixed therein. This combined flow of cooling fluid then enters into the inlet 46 of the radiator 45, and is then cooled within the radiator 45 in a per se well known fashion, and passes out of the outlet 47 of the radiator 45 into the upstream end of the radiator output conduit 48, along which it flows, and from the downstream end of which it passes both into the upstream end of the head input conduit 49 and also into the upstream end of the block input conduit 50. Then a part of this cooled cooling fluid passes through the head input conduit 49 to be supplied to the inlet of the cylinder head pump 40, which pumps it into the cylinder head inlet 36, whence it is returned to the head cooling jacket 34, and also a part of this cooled cooling fluid passes through the block input conduit 50 to be supplied to the inlet of the cylinder block pump 41, which pumps it into the cylinder block inlet 37, whence it is returned to the block cooling jacket 35.

Of course, at this time, cooling action is provided in this mode of operation by the shown cooling system and the first preferred embodiment of the valve according to the present invention both to the cylinder head 32 and also to the cylinder block 33, because both cylinder head 32 and also the cylinder block 33 are receiving flow of cooling fluid which has passed through the radiator 45; and the operation of the shown cooling system and the first preferred embodiment of the valve according to the present invention is not only to cool the cylinder head 32 of the internal combustion engine 31, which directly receives most of the heat generated by the operation of the internal combustion engine 31, by using the maximum cooling capacity of the radiator 45, but also to cool the cylinder block 33 which directly receives only a minor part of the generated heat, but which is somewhat overheated at this time.

It should be noted that, if the heater flow regulation valve 54 is opened at this time and flow of cooling fluid is occurring in the heater feed conduit 53 and through the heater 52, then this flow of cooling fluid will pass down the block recirculation conduit 51 to be returned to the block input conduit 50 to be supplied to the inlet of the cylinder block pump 41, which pumps it into the cylinder block inlet 37, whence it is returned to the block cooling jacket 35 without being cooled; but this flow will in any event be quite small in volume, and will not substantially affect the operation of the cooling system and the valve according to the present invention; accordingly it will not be further considered here.

As a result of the above explained modes of operation, when the temperature of the cooling fluid within the lower chamber 68 which has flowed through the block cooling jacket 35 to cool it and has been heated therein and has flowed out from the cylinder block outlet 39 through the second inlet port 96 into said lower chamber 68 comes to be above said predetermined second temperature which has been exemplarily taken as 95° C. from being below said predetermined second temperature, immediately the state of the second control valve 100 alters due to the melting of its mass of thermally expansible material and the second outlet port 98 which was open before is closed while the second communication port 70 which was closed before is opened; and thereby the cooling system, from the operational mode in which the cylinder head 32 alone was cooled by using the maximum cooling capacity of the radiator 45 while the cylinder block 33 was not cooled at all, transits to the operational mode wherein the cylinder head 32 and the cylinder block 33 are cooled together by the cooling fluid flows which pass through them being mixed before both passing through the radiator 45 to be cooled therein. Thus, in this case, soon the temperature of the cooling fluid which has flowed through the block cooling jacket 35 to cool it and has been heated therein and has flowed out from the cylinder block outlet 39 through the second inlet port 96 into said lower chamber 68 drops and comes to be below said predetermined second temperature from being above said predetermined second temperature, and then immediately the state of the second control valve 100 again alters due to the solidifying of the mass of thermally expansible material and the second outlet port 98 which was closed before is opened while the second communication port 70 which was opened before is closed; and thereby the cooling system, from the operational mode in which the cylinder head 32 and the cylinder block 33 were cooled together by the cooling fluid flows which passed through them being mixed before both passing through the radiator 45 to be cooled therein yet again transits back to its operational mode wherein the cylinder head 32 alone is cooled by using the maximum cooling capacity of the radiator 45 while the cylinder block 33 is not cooled at all. Thus, in this case, soon the temperature of the cooling fluid which has flowed through the block cooling jacket 35 to cool it and has been heated therein and has flowed out from the cylinder block outlet 39 through the second inlet port 96 into said lower chamber 68 again rises and comes to be above said predetermined second temperature from being below said predetermined second temperature.

By a repitition of this to and fro action of the second control valve 100, therefore, the temperature of the cooling fluid which has flowed through the block cooling jacket 35 to cool it and has been heated therein and has flowed out from the cylinder block outlet 39 through the second inlet port 96 into said lower chamber 68 is kept quite near the second predetermined temperature of exemplarily 95° C., by said block cooling fluid flow being alternatively passed through the block recirculation conduit 51 to be recirculated to the cylinder block 33 without being substantially cooled, or being mixed with the head cooling fluid flow and being passed through the radiator 45 to be cooled. Thus the temperature of the cylinder block 33 is regulated to a proper quite high value, substantially higher than the temperature of the cylinder head 32, without however rising to too high a level. In other words, by the combination of these two actions of the second control valve 100, according to whether the temperature of the cooling fluid flowing out from the cylinder block outlet 39 of the block cooling jacket 35 is less than said second predetermined temperature value, exemplarily 95° C., or alternatively is greater than said second predetermined temperature value, therefore, in a feedback manner, the temperature of the cooling fluid passing out through the cylinder block outlet 39 of the block cooling jacket 35 is maintained substantially to be at the second above described predetermined temperature value of 95° C. This means that the temperature of the cylinder block 33 as a whole is maintained substantially at the second predetermined temperature value, i.e. in the shown first preferred embodiment, at 95° C., which is of course substantially higher than the temperature at which the cylinder head 32 is being maintained at this time, since the cooling fluid which is circulating through the head cooling jacket 34 is always entirely, as described above, cooling fluid which has passed through the radiator 45 to be cooled.

Accordingly, by thus keeping the cylinder head 32 substantially cooler than the cylinder block 33 during warmed up operation of the internal combustion engine 31, the cylinder block 33 may be kept significantly hotter than is possible with a conventional cooling system in which the head cooling fluid and the block cooling fluid are both always being passed through the same radiator and are always being cooled together. Further, the temperature of the lubricating oil contained within the internal combustion engine 31 is at this time kept at least at the temperature of the cylinder block 33, and in fact is maintained at a significantly higher temperature, due to the ongoing and continuous dissipation of mechanical energy therin. Of course, by keeping the cylinder head 32 as cool as possible, and by using as much of the capacity of the radiator 45 as possible for cooling the cylinder head 32, the possibility of the occurrence of knocking or pinking in the internal combustion engine 31 is greatly reduced. The keeping of the cylinder block 33 as hot as possible within a predetermined limit, i.e. substantially at the second predetermined temperature value of exemplarily 95° C., ensures that frictional losses in the internal combustion engine 31 are kept as low as possible, and also is beneficial with regard to the minimization of the amount of noxious components which are emitted in the exhaust gases of the internal combustion engine 31. Further, in contrast to a conventional type of cooling system as discussed above which uses completely separate cooling systems for the cylinder head and for the cylinder block, the full capacity of the radiator 45 can be effectively utilized, according to the cooling system described above, because of the flexibility available for determining the proportions of the cooling capacity of the radiator 45 which can be allocated to the cylinder head 32 and to the cylinder block 33 for cooling them.

Figure 3:
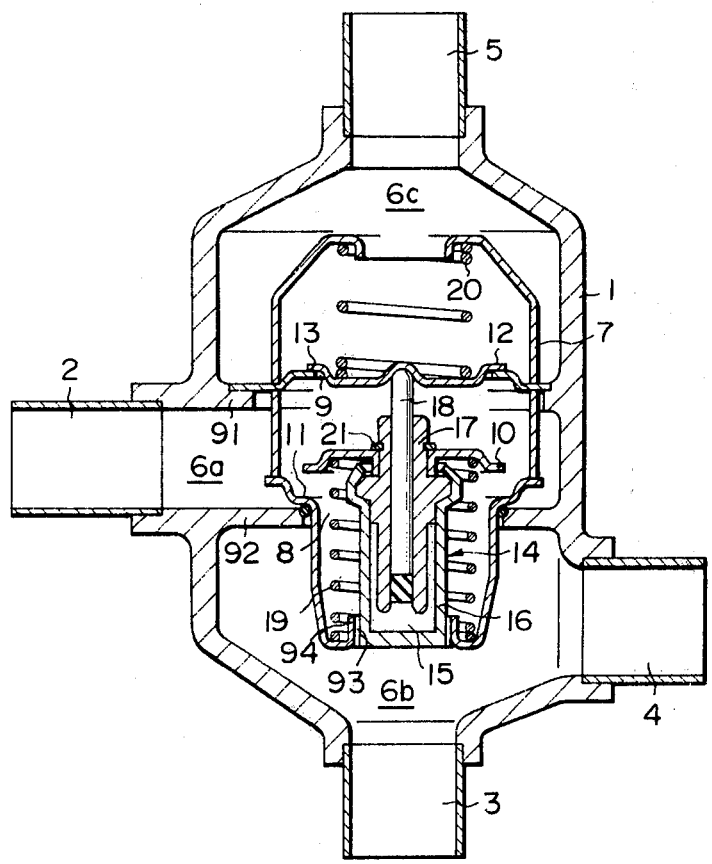
FIG. 3 is a sectional view, similar to FIG. 1, showing a valve casing within which is fitted a valve which is a second preferred embodiment of the present invention, in which second preferred embodiment such a first valve element is fitted around an intermediate portion of a needle guide member protruding from said temperature sensitive actuator outer casing.

In FIG. 3, there is shown a second preferred embodiment of the valve according to the present invention, in a fashion similar to FIG. 1. In FIG. 3, parts, ports, and apertures of the second preferred embodiment shown, which correspond to parts, ports, and apertures of the first preferred embodiment shown in FIGS. 1 and 2, and which have the same functions, are designated by the same reference numerals and symbols as in those figures.

The construction of this second preferred embodiment of the valve according to the present invention is similar to the construction of the first preferred embodiment described above, except that the first valve element 10 is not, as was the case in the first preferred embodiment, generally annular in form and fixed and sealed around an intermediate portion of the outer casing 16 of the generally cylindrical temperature sensitive actuator 14. On the contrary, the construction is as follows. In this second preferred embodiment, as in the first preferred embodiment shown in FIG. 1, the outer casing 16 of the generally cylindrical temperature sensitive actuator 14 is as previously formed in a generally cylindrical form, and its lower end in FIG. 3 is closed while its upper end is opened. This open upper end of the outer casing 16 is again tightly fitted around the needle guide member 17 by crimping or the like, and the needle guide member 17, again in this second preferred embodiment, projects somewhat upwards in FIG. 3 from the inside of the temperature sensitive actuator 14. And, in this second preferred embodiment in contrast to the construction of the first preferred embodiment shown in FIG. 1, the first valve element 10 is not annular in form, but is of the form of a disk with a medium sized hole pierced through its center (smaller than the hole in the annular first valve element of the FIG. 1 embodiment), and this hole (on the inside periphery of which there is fitted a short mounting tube of approximately the same diameter as said needle guide member 17), is fitted over the projecting portion of the needle guide member 17, in a manner such as to seal thereagainst. Further, the first valve element 10 is retained on said projecting portion of the needle guide member 17, abutting against a step formed in said projecting portion slightly within the crimped over upper end portion in FIG. 3 of the outer casing 16 of the generally cylindrical temperature sensitive actuator 14 which holds said needle guide member 17, by a snap ring 21 mounted in a groove formed around said projecting portion of said needle guide member 17 at an appropriate location therealong. In line with this slightly different axial position of the first valve element 10, the outer edge portion of said first valve element 10 is offset axially in the direction towards the first valve seat 11, rather than, as was the case in the first preferred embodiment of the valve according to the present invention shown in FIG. 1, away from said valve seat 11; but this is irrelevant to the gist of the present invention.

The advantage of this construction as used in the second preferred embodiment in that since in this embodiment the outer casing 16 of the temperature sensitive actuator 14 is kept completely below (in the sense of FIG. 3) the first valve element 10, thereby said outer casing 16 is kept entirely within the lower chamber 6c, and accordingly no part of said outer casing 16 is exposed to cooling fluid at any other temperature than the temperature of the fluid within said lower chamber 6c. Thus the temperature sensitive actuator 14 only responds to the temperature of the cooling fluid within the lower chamber 6c, and does not even to a slight extent respond to the temperature of the cooling fluid within the middle chamber 6a, as is desirable from the point of view of the control function explained with reference to the cooling system shown in FIG. 2. This contrasts with the state of affairs in the previously described first preferred embodiment of the valve according to the present invention shown in FIGS. 1 and 2, in which a substantial part of the outer casing 16 of the temperature sensitive actuator 14 projects above the first valve element 10 into the middle chamber 6a, and accordingly the temperature sensitive actuator 14 does not only respond to the temperature of the fluid within the lower chamber 6c, but also to a certain extent responds to the temperature of the fluid within the middle chamber 6a, which is undesirable from the point of view of the control function explained with reference to the cooling system shown in FIG. 2, because it will probably occur that the temperature of the cooling fluid flowing through said middle chamber 6a becomes substantially lower than the melting point of the mass 15 of thermal expansion material in the temperature sensitive actuator 14, even though the temperature of the cooling fluid flowing through said lower chamber 6c is still higher than the melting point of the mass 15 of thermal expansion material, when a cooling system such as the one shown in FIG. 2 to which the valve shown in FIG. 3 is fitted is operating in its mode of providing completely separated cooling fluid flow circuits for the cylinder head and the cylinder block of the internal combustion engine; and, if the temperature sensitive actuator 14 does not only respond to the temperature of the fluid within the lower chamber 6c but also to a certain extent responds to the temperature of the fluid within the middle chamber 6a, then in these operational conditions the mass 15 of thermal expansion material therein may again solidify, and this will result, improperly, in the first valve element 10 being moved back to disengage from the first seat 11, thus opening the valve port 8, and in the second valve element 12 being moved again towards the second valve seat 13, thus closing the port 9. This would result in loss of cooling function for the internal combustion engine at this time, which is a malfunction.

This second preferred embodiment of the valve according to the present invention described above and shown in FIG. 3, as suggested above, can be used in a cooling system for an internal combustion engine like the cooling system shown in FIG. 2, in place of the first control valve 99 used in that cooling system, and the functioning of such a cooling system will be substantially the same as the already described functioning of the cooling system shown in FIG. 2 which used the first preferred embodiment of the valve according to the present invention, except that as explained above it is more surely ensured that the temperature sensitive actuator 14 of the first control valve 99 of the control valve assembly 60 of such a cooling system reponds only to the temperature of the cooling fluid which is passing out of the block cooling jacket 35 after having been cooled therein, and does not respond to the temperature of the cooling fluid within the upper chamber 67.

Figure 4:
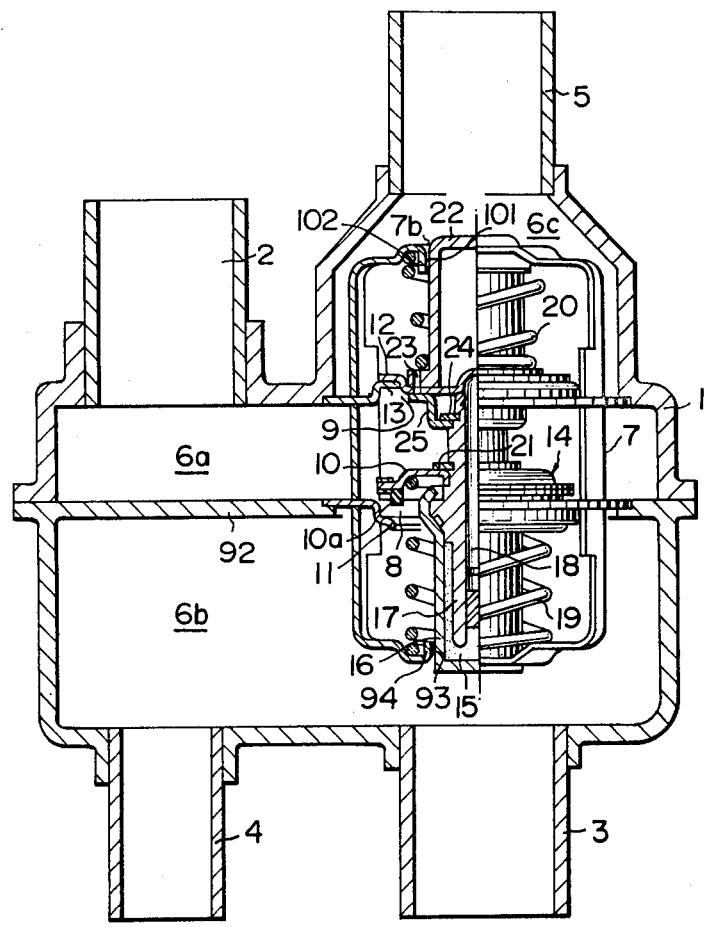
FIG. 4 is a part sectional view, rather similar to FIGS. 1 and 3, showing a valve casing within which is fitted a valve which is a third preferred embodiment of the present invention, in which third preferred embodiment a bypass valve element is fitted around a portion of said needle guide member protruding from said temperature sensitive actuator outer casing, and controls the opening and closing of a set of bypass ports formed in a second valve element.

In FIG. 4, there is shown a third preferred embodiment of the valve according to the present invention, in a fashion similar to FIGS. 1 through 3. In FIG. 4, parts, ports, and apertures of the third preferred embodiment shown, which correspond to parts, ports, and apertures of the first and second preferred embodiments, shown respectively in FIGS. 1 and 2 and in FIG. 3, and which have the same functions, are designated by the same reference numerals and symbols as in those figures.

This third preferred embodiment of the valve according to the present invention is shown as mounted in a valve casing 1, which in fact may be formed from several joined pieces. This valve casing 1 is formed with a first port 2, a second port 3, a third port 4, and a fourth port 5, which are formed as junction pipes extending outwards from the valve casing 1, so that this third preferred embodiment of the valve according to the present invention as a whole is easily detachable from the cooling system of a vehicle in which it is designed to be used for replacement, servicing, and the like. Within the valve casing 1 there are defined an upper chamber 6c, a middle chamber 6a, and a lower chamber 6b, all as seen in the sense of FIG. 4, the chambers 6a and 6c being separated by a second valve seat 13 which will shortly be described and which is formed with an aperture through it, and the chambers 6a and 6b being separated by a partition wall 92, which is also formed with an aperture through it.

Although the positions and orientations of the first through fourth ports 1, 2, 3, and 4 differ in this shown valve casing assembly in which the third preferred embodiment of the valve according to the present invention is included from those in the valve casing assemblies which used the first and second preferred embodiments as shown in FIGS. 1, 2, and 3, in fact it will be understood by one skilled in the art that they are equivalent from the point of view of connectivity.

Within the valve casing 1 there is mounted the third preferred embodiment of the valve according to the present invention, in such a position as to control communication between the upper chamber 6c and the middle chamber 6a and between the middle chamber 6a and the lower chamber 6b via the aperture through the partition wall 92. The central axis of the opening between the upper chamber 6c and the middle chamber 6a is roughly coincident, in this third preferred embodiment, with the central axis of the aperture through the partition wall 92, and the partition wall 92 extends generally perpendicularly to said central axis. A valve frame 7 is fixed inside the valve casing 1 so as to block between the upper chamber 6c and the middle chamber 6a and so as to block the aperture through said partition wall 92, and is formed of a generally hollow cylindrical form with openings through its sides (although these openings cannot in fact be seen in the figures), so that communication between the inside of the valve frame 7 and the outside thereof is freely established. The valve frame 7 passes through the middle chamber 6a, and one of its ends projects into the upper chamber 6c, while its other end projects into the lower chamber 6b. To the inner part of said valve frame 7 there are fixed as generally coaxial with one another and with the opening between the upper chamber 6c and the middle chamber 6a and with the opening in the partition wall 92 two generally annular valve seats: a first annular valve seat 11 the circular opening through which opens between the middle chamber 6a and the lower chamber 6b, and which controls the aperture through said partition wall 92; and a second annular valve seat 13 the circular opening through which opens between the upper chamber 6c and the middle chamber 6a, and which controls the aperture between said upper chamber 6c and said middle chamber 6a. Through the center of the first annular valve seat 11 there is formed a circular hole or first port 8, which when open provides a first fluid flow path between the middle chamber 6a and the lower chamber 6b; and through the center of the second annular valve seat 13 there is formed a circular hole or second port 9, which when open provides a second fluid flow path between the middle chamber 6a and the upper chamber 6c.

A first disk shaped valve element 10 cooperates with the first annular valve seat 11 so as selectively to establish and to break communication through said first port 8 between the middle chamber 6a and the lower chamber 6b; and a second disk shaped valve element 12 cooperates with the second annular valve seat 13 so as selectively to establish and break communication through said second port 9 between the upper chamber 6c and the middle chamber 6a. As in the other preferred embodiments described above, a temperature sensitive actuator 14 is provided. Within the outer casing 16 of this temperature sensitive actuator 14 there is held a mass 15 of thermally expansible material such as so called thermowax. The outer casing 16 is formed in a generally cylindrical form, and its lower end in FIG. 4 is closed while its upper end is opened. This open upper end of the outer casing 16 is tightly fitted around a needle guide member 17 by crimping or the like, and the needle guide member 17, in this third preferred embodiment, projects somewhat further upwards in FIG. 4 out from the inside of the temperature sensitive actuator 14 than did the needle guide members 17 of the first and second preferred embodiments of the valve according to the present invention shown in FIGS. 1 and 2. Through the center of the needle guide member 17 along its axis there is formed a cylindrical hole which tightly slidingly receives a needle member 18 and forms a liquid seal around the outer surface of said needle member 18. Thus, the mass of thermally expansible material 15 is confined within the inside of the outer casing 16 of the temperature sensitive valve actuator 14, and is communicated to the lower end of the needle member 18. The needle member 18 is capable of movement in the up and down direction in FIG. 4 relative to the outer casing 16 of the temperature sensitive acutator 14 by sliding in said central hole through the needle guide member 17, and the upper end in the figure of the needle member 18 is pressed against a dimple formed in the lower surface of the second valve member 13.

In this third preferred embodiment of the valve according to the present invention, as in the second preferred embodiment described above and shown in FIG. 3, the first valve element 10 is not annular in form, but is of the form of a disk with a medium sized hole pierced through its center (smaller than the hole in the annular first valve element of the FIG. 1 embodiment), and this hole (on the inside periphery of which there is fitted a short mounting tube of approximately the same diameter as the outer diameter of said needle guide member 17), is fitted over the projecting portion of said needle guide member 17, in a manner such as to seal thereagainst. Further, the first vave element 10 is retained on said projecting portion of the needle guide member 17, abutting against a step formed in said projecting portion slightly within the crimped over upper end portion in FIG. 4 of the outer casing 16 of the generally cylindrical temperature sensitive actuator 14 which holds said needle guide member 17, by a snap ring 21 mounted in a groove formed around said projecting portion of said needle guide members 17 at an appropriate location therealong. In line with this axial position of the first valve element 10, the outer edge portion of said first valve element 10 is offset axially in the direction towards the first valve seat 11, rather than, as was the case in the first preferred embodiment of the valve according to the present invention shown in FIG. 1, away from said valve seat 11; but this is strictly speaking irrelevant to the gist of the present invention.

The lower end as seen in FIG. 4 of this generally cylindrical casing 16 is slidably fitted through a guide hole 93, which is formed in the lowermost portion in the figure of the valve frame 7, and which is provided on its inner periphery with a short guide tube 94 for keeping the first valve element 10 and the outer casing 16 straight and coaxial with the axis of the first and second valve seats 11 and 13, as said first valve element 10 and said outer casing 16 move upwards and downwards in the figure as will be seen later. This combination of the first valve element 10 and the outer casing 16 of the temperature sensitive actuator 14 is biased in the upward direction in FIG. 4 by a compression coil spring 19, the upper end of which in the figure bears against the lower surface of the first valve element 10, and the lower end of which in the figure bears against a lower portion of the valve frame 7 around the guide tube 94. Further, the second valve element 12 is fixed to a guide cylinder 22 of a tubular shape, the upper end of which in FIG. 4 is slidably fitted through a guide hole 101, which is formed in the uppermost portion in the figure of the valve frame 7, and which is provided on its inner periphery with a short guide tube 102 for keeping the valve element 12 and the guide cylinder 22 straight and coaxial with the axis of the first and second valve seats 11 and 13, as said valve element 12 and said guide cylinder 22 move upwards and downwards in the figure as will be seen later. This combination of the second valve element 12 and the guide cylinder 22 are biased in the downward direction in FIG. 4 by another compression coil spring 20, the lower end of which in the figure bears against the upper surface of the second valve element 12, and the upper end of which in the figure bears against an upper portion of the valve frame 7, around said guide tube 102. Particularly according to an important feature of the present invention, as in the first and second preferred embodiments, the compression coil spring 20 is arranged to have a substantially stronger compression force than the compression coil spring 19.

The feature of the mounting of the second valve element 12 to the guide cylinder 22 is not particularly functionally important to the operation of the third preferred embodiment of the valve according to the present invention, but is only a constructional expedient, which however can be useful. However, the particular way in which this third preferred embodiment differs from the previously described first and second preferred embodiments is as follows. Through the second valve element 12 (and through a part of the guide cylinder 22 which otherwise would obstruct them) there are pierced a number of holes or bypass valve ports 23, only one of which can be seen in FIG. 4. The total cross sectional area of all these bypass ports 23 is very much smaller than the cross sectional area of the port 9 through the second valve seat 13. A bypass valve element 25 is formed as a disk with a central hole through its center, of substantially the same diameter as the outside diameter of the needle guide member 17. This bypass valve element 25 is fitted over the upper part in FIG. 4 of the projecting portion of the needle guide member 17, which extends so far in the upwards direction in the figure that its uppermost portion is very close to the lower surface in the figure of the second valve element 12, and said bypass valve element 25 is retained on said upper part of said projecting portion of said needle guide member 17, abutting against a step formed in said projecting portion at an appropriate location therealong, by a snap ring 24 mounted in a groove formed around said projecting portion of said needle guide member 17 also at an appropriate location therealong. In line with this axial position of the bypass valve element 25, the outer edge portion of said bypass valve element 25 is offset axially in the direction towards the second valve element 12.

As shown in FIG. 3, the positions of the parts are arranged to be such that, when the needle element 17 is penetrated to its maximum possible extent within the hole in the needle guide member 18 towards the inside of the temperature sensitive actuator 14, and when the first valve element 10 is removed away from the first valve seat 11 as will be seen later under the compression action of the compression coil spring 19, thus opening the first valve port 8, while the second valve element 12 is firmly seated against the second valve seat 13 as will be seen later under the compression action of the compression coil spring 20; then the upper surface of the bypass valve element 25 is just in contact with the lower surface of the second valve element 12 and closes the bypass valve ports 23. In fact, this maximum possible extent of penetration of the needle element 17 into the hole in the needle guide member 18, i.e. the maximum possible extent of contraction in length of the temperature sensitive actuator 14, may be defined and caused by the coming into contact of the upper end in FIG. 4 of the needle guide member 17 with the lower surface of the second valve element 12. On the other hand, as soon as the needle element 18 moves upwards in FIG. 4 relative to the needle guide member 17 by even a small amount from said maximum penetration position, then the distance between the lower surface of the second valve element 12 and the upper surface of the bypass valve element 25 will increase (by the motion of one of these elements away from the other: which of them moves, and which of them remains stationary, wil be seen later), and when this happens immediately the upper surface of the bypass valve element 25 will come away from the bypass valve ports 23, thus opening these bypass valve ports 23.

The operation of this third preferred embodiment of the valve according to the present invention is as follows.

When the temperature of the cooling fluid within the lower chamber 6b swirling around the casing 16 of the temperature sensitive actuator 14 is below a predetermined temperature which for example in this third preferred embodiment may again be 80° C., then the temperature of the mass of thermally expansible material 15 within the temperature sensitive actuator 14 is also below said predetermined temperature, and at this time said mass of thermally expansible material 15 is in a solid state and does not exert significant pressure on the lower end of the needle member 18, and therefore the needle member 18 is squeezed, by the biasing actions of the compression coil springs 19 and 20, deeply downwards in the sense of FIG. 4 with respect to the outer casing 16 of the temperature sensitive actuator 14, sliding downwards through the central hole through the needle guide member 17, so as to penetrate deeply within said temperature sensitive actuator 14; and, since as mentioned above the compression coil spring 20 has a substantially stronger compression force than does the compression coil spring 19 and overcomes it, the combination of the outer casing 16 of the temperature sensitive actuator 14 and the needle member 18 deeply embedded therein is positioned, by said outer casing 16 sliding through the guide tube 94, to its position in which it is shown in FIG. 4, wherein the first valve element 10 is moved away from the first valve seat 11 and opens the first port 8 therethrough thus establishing communication between the middle chamber 6a and the lower chamber 6b, i.e. opening said first port 8 and establishing communication along said first fluid flow path, and said second valve element 12 is seated against the second valve seat 13 and closes the second port 9 therethrough thus interrupting communication between the upper chamber 6c and the middle chamber 6a, i.e. closing said second port 9 and interrupting communication along said second fluid flow path. At this time, as explained above, the bypass valve member 25 is seated against the bypass ports 23, thus closing said bypass ports 23.

On the other hand, when the temperature of the cooling fluid within the lower chamber 6b swirling around the casing 16 of the temperature sensitive actuator 14 progressively rises above said predetermined temperature which for example in this third preferred embodiment has been taken as 80° C., then the temperature of said mass of thermally expansible material 15 also progressively rises above said predetermined temperature, and at this time said mass of thermally expansible material 15 progressively melts and comes to be in the liquid state and expands very substantially, thus progressively coming to exert significant pressure on the lower end of the needle member 18, and therefore the needle member 18 is progressively, along with the melting of the mass of thermally expansible material 15, driven out of the central hole formed in the needle guide member 17, i.e. is driven in the upward direction in FIG. 4 relative to the outer casing 16 of the temperature sensitive actuator 14, so as to increase the space available within said outer casing 16 to accomodate the melted thermally expansible material 15.

Now, as this driving of the needle member 18 upwards relative to the outer casing 16, i.e. this elongation in the vertical direction in FIG. 4 of the combination of the needle member 18 and the outer casing 16, continues progressively, it is clear that either the first valve element 10 and the outer casing 16 fixed thereto must move downwards in FIG. 4, or the second valve element 12 must move upwards in FIG. 4, in order to accomodate this elongation. In fact, because as mentioned above the compression coil spring 20 is substantially stronger and exerts a substantially greater compression force than the compression coil spring 19, first the first valve element 10 and the outer casing 16 fixed thereto will move downwards in FIG. 4 progressively against the compression force of the compression coil spring 19 which is overcome, without the second valve element 12 moving upwards in FIG. 4 against the compression force of the compression coil spring 20, until said first valve element 10 is firmly seated against the first valve seat 11 and the first port 8 is thereby closed thus interrupting communication between the middle chamber 6a and the lower chamber 6b via said first port 8, i.e interrupting fluid flow along the first fluid flow path. During this process, the outer casing 16 slides through the guide tube 74 fixed in the guide hole 93 of the valve frame 7, and the needle member 18 is stationary relative to the valve frame 7. And, as soon as this movement has started, the needle guide member 17 of course moves downward in FIG. 4 to a certain extent, thus removing the bypass valve member 25 from the bypass valve ports 23 and unblocking these valve ports 23.

Then, only after said first valve element 10 is firmly seated against the first valve seat 11 and the first port 8 is thereby closed thus interrupting communication between the middle chamber 6a and the lower chamber 6b via said first port 8, i.e. only after said first port 8 has been definitely closed, only then does the second valve element 12 start to move progressively upwards in FIG. 4 against the compression force of the compression coil spring 20 which is overcome, and therefore only then does said second valve element 12 start to move away from the second valve seat 13 and start to open the second port 9, thus establishing free communication between the middle chamber 6a and the upper chamber 6c (i.e. communication through the second valve port 9, as opposed to communication via the bypass valve ports 23 which are relatively restricted), i.e. only then is fluid flow along the second fluid flow path commenced to be established. During this process, the outer casing 16 of course does not slide through the guide tube 74 fixed in the guide hole 93 of the valve frame 7, but on the other hand the needle member 18 is not stationary relative to the valve frame 7, but moves upwards with respect thereto.

Thus, in this third preferred embodiment of the valve according to the present invention also, it is positively prevented that both the first valve port 8 which communicates between the middle chamber 6a and the lower chamber 6b, and the second valve port 9 which communicates between the middle chamber 6a and the upper chamber 6c, should be opened at the same time; i.e., it is positively prevented that communication should be simultaneously established along the first fluid flow path between the middle chamber 6a and the lower chamber 6b and along the second fluid flow path between the middle chamber 6a and the upper chamber 6c. Thus it is positively prevented that any communication should ever be established between the upper chamber 6c and the lower chamber 6b; i.e., communication via the series combination of the first fluid flow path and the second fluid flow path is positively prevented.

On the other hand, while in the first and second preferred embodiments of the valve according to the present invention shown in FIGS. 1 through 3 and described above, during the action when the temperature of the cooling fluid in the lower chamber 6b rises above said predetermined temperature of exemplarily 80° C., and during the transient time (which might actually not be a particularly short time) after the moment when the first port 8 has been substantially closed by the first valve element 10 seating against the first valve seat 11 and before the moment when the second port 9 has been substantially opened by the second valve element 12 moving substantially away from the second valve seat 13, the middle chamber 6a is communicated to neither the upper chamber 6b nor the lower chamber 6c to even a slight extent, and accordingly is isolated, which as explained previously in the section of this specification entitled "BACKGROUND OF THE INVENTION" can in certain circumstances cause difficulty of operation of a cooling system to which the valve according to the present invention was fitted, by contrast to this, with the shown third preferred embodiment of the valve according to the present invention during this transient time the middle chamber 6a is communicated to a certain smallish amount with the upper chamber 6b, via the bypass valve ports 23. This smallish degree of communication is enough to relieve the middle chamber 6a during this transient period, allowing a certain small flow of fluid between the middle chamber 6a and the upper chamber 6b, and is very helpful for preventing the above detailed difficulties of operation.

It is true that, because of the provision of the bypass valve ports 23 which are opened by the bypass valve element 25 as soon as the first valve element 10 and the outer casing 16 fixed thereto start to move downwards in FIG. 4, during this downwards movement of the first valve element 10 and the outer casing 16 the upper chamber 6b is communicated to a certain extent with the lower chamber 6c, via these bypass valve ports 23 and the open first port 8. If this communication were very substantial, difficulties would arise in the operation of a cooling system to which the valve according to the present invention was fitted of the sort also described above in the section of this specification entitled "BACKGROUND OF THE INVENTION"; but, because the bypass valve ports 23 are of a total relatively small cross section, no substantial such problems arise in practice.

On the other hand, when from this condition outlined above in which the temperature of the cooling fluid within the lower chamber 6b swirling around the casing 16 of the temperature actuator 14 is above said predetermined temperature which for example in this third preferred embodiment has been taken as 80° C., and then the temperature of said cooling fluid swirling around the casing 16 of the temperature sensitive actuator 14 progressively drops below said predetermined temperature, then the temperature of said mass of thermally expansible material 15 also progressively drops below said predetermined temperature, and at this time said mass of thermally expansible material 15 progressively solidifies and comes to be in the solid state and progressively contracts very substantially, thus coming to exert progressively less and less pressure on the lower end of the needle member 18, and therefore the needle member 18 is progressively, along with the solidifying of the mass of thermally expansible material 15, allowed to return into the central hole formed in the needle guide member 17, i.e. is allowed to move in the downward direction in FIG. 4 under the compression actions of the compression coil springs 19 and 20 relative to the outer casing 16 of the temperature sensitive actuator 14, so as to decrease the space available within said outer casing 16 in accordance with the decrease in volume of the solidifying thermally expansible material 15.

Now, as this driving of the needle member 18 downwards relative to the outer casing 16, i.e. this contraction in the vertical direction in FIG. 4 of the combination of the needle member 18 and the outer casing 16, continues progressively, it is clear that either the first valve element 10 and the outer casing 16 fixed thereto must move upwards in FIG. 4, or the second valve element 12 must move downwards in FIG. 4, under the compression actions of the compression coil springs 19 and 20, in order to follow this contraction. In fact, because as mentioned above the compression coil spring 20 is substantially stronger and exerts a substantially greater compression force than the compression coil spring 19, first the second valve element 12 moves progressively downwards in FIG. 4 under the compression force of the compression coil spring 20, towards the second valve seat 13, until said second valve element 12 reaches said second valve seat 13 and seats tightly thereagainst, thus closing the second port 9 therethrough and interrupting communication along the second fluid flow path, without the first valve element 10 moving upwards in FIG. 4 under the compression force of the compression coil spring 19. During this process, the outer casing 16 of course does not slide through the guide tube 94 fixed in the guide hole 93 of the valve frame 7, but on the other hand the needle member 18 is not stationary relative to the valve frame 7, but moves downwards with respect thereto.

When said second valve element 12 reaches said second valve seat 13 and seats tightly thereagainst, thus closing the second port 9 therethrough and interrupting communication along the second fluid flow path, during the transient time (which might actually not be a particularly short time) after this moment and before the moment when the first port 8 has been substantially opened by the first valve element 10 moving substantially away from the first valve seat 11, in the first and second preferred embodiments of the valve according to the present invention described above the middle chamber 6a is communicated to neither the upper chamber 6b nor the lower chamber 6c to even a slight extent, and accordingly is isolated, which as explained previously in the section of this specification entitled "BACKGROUND OF THE INVENTION" can in certain circumstances cause difficulty of operation of a cooling system to which the valve according to the present invention was fitted. By contrast to this, with the shown third preferred embodiment of the valve according to the present invention, during this transient time the middle chamber 6a is communicated to a certain smallish amount with the upper chamber 6b, via the bypass valve ports 23. This smallish degree of communication is enough to relieve the middle chamber 6a during this transient period, allowing a certain small flow of fluid between the middle chamber 6a and the upper chamber 6b, and is very helpful for preventing the above detailed difficulties of operation.

Then, only after said second valve element 12 is firmly seated against the second valve seat 13, and the second port 9 has been definitely closed, only then does the first valve element 10 start to move progressively upwards in FIG. 4 according to the compression force of the compression coil spring 19, and therefore only then does said first valve element 10 start to move away from the first valve seat 11 and start to open the first port 8, thus establishing communication between the middle chamber 6a and the lower chamber 6b, i.e. only then is fluid flow along the second fluid flow path commenced to be established. During this process, the outer casing 16 slides upwards in the figure through the guide tube 94 fixed in the guide hole 93 of the valve frame 7, and the needle member 18 is stationary relative to the valve frame 7.

It is true that, because of the provision of the bypass valve ports 23 which are opened by the bypass valve element 25 until the first valve element 10 and the outer casing 16 fixed thereto reach their uppermost positions as seen in FIG. 4, during this upwards movement of the first valve element 10 and the outer casing 16 the upper chamber 6b is communicated to a certain extent with the lower chamber 6c, via these bypass valve ports 23 and the open first port 8. If this communication were very substantial, difficulties would arise in the operation of a cooling system to which the valve according to the present invention was fitted of the sort also described above in the section of this specification entitled "BACKGROUND OF THE INVENTION"; but, because the bypass valve ports 23 are of a total relatively small cross section, no substantial such problems arise in practice.

Thus, it is again positively prevented, according to this third preferred embodiment of the valve according to the present invention, that both the first valve port 8 which communicates between the middle chamber 6a and the lower chamber 6b, and the second valve port 9 which communicates between the middle chamber 6a and the upper chamber 6c, should be opened at the same time; i.e., it is positively prevented that substantially great communication should be simultaneously established along the first fluid flow path between the middle chamber 6a and the lower chamber 6b and along the second fluid flow path between the middle chamber 6a and the upper chamber 6c. Thus it is positively prevented that any very substantial communication should ever be established between the upper chamber 6c and the lower chamber 6b; i.e., again, very substantial communication via the series combination of the first fluid flow path and the second fluid flow path is positively prevented; while, on the other hand, a certain amount of communication between the middle chamber 6a and the upper chamber 6c is provided through the bypass ports 23 at the transient time that otherwise the middle chamber 6a would be completely isolated from both the upper chamber 6c and the lower chamber 6b, and this ensures that the difficulties outlined earlier in this specification are prevented from occurring.

This third preferred embodiment of the valve according to the present invention described above and shown in FIG. 4 can again be used in a cooling system for an internal combustion engine like the cooling system shown in FIG. 2, in place of the first control valve 99 used in that cooling system, and the functioning of such a cooling system will be substantially the same as the already described functioning of the cooling system like the one shown in FIG. 2 which used the second preferred embodiment of the valve according to the present invention, except that: as outlined above, during the transient period during switching of the first control valve 99 according to this third preferred embodiment of the present invention over when the temperature of the cooling fluid in the lower chamber 68 has just risen over the first predetermined temperature of exemplarily 80° C. from below said first predetermined temperature, and also during the transient period during switching of the first control valve 99 according to this third preferred embodiment of the present invention over when the temperature of the cooling fluid in the lower chamber 68 has just fallen below said first predetermind temperature of exemplarily 80° C. from above said first predetermined temperature, when the control valve 99 is in the intermediate state in which the first control valves of the first and second cooling systems explained which were according to the first and second preferred embodiments of the present invention were closing both the first communication port 69 and also the first outlet port 97, then a certain degree of communication is provided between the first inlet port 95 and the first outlet port 97 through the bypass ports 23, and accordingly stopping of the flow of cooling flow through the head cooling jacket 34 of the cylinder head 32 of the internal combustion engine 31 is positively prevented. This acts to prevent sudden boiling of the cooling fluid in the head cooling jacket 34, and also helps to prevent the formation of air locks or the like in the passages of the head cooling jacket 34.

At the same time, further, as in the case of the first and second cooling systems explained, during the transition between the operational state wherein the temperature of the cooling fluid within the lower chamber 68 is less than the first predetermined temperature which has exemplarily been taken as 80° C. and the operational state wherein the temperature of the cooling fluid within the lower chamber 68 is higher than said first predetermined temperature, as explained above with relation to the functioning of the third embodiment of the valve according to the present invention, because the first valve element 10 becomes firmly seated against the first valve seat 11 and closes the first communication port 69 before the second valve element 12 starts to be moved away from the second valve seat 13 and starts to open the first outlet port 97, therefore it does not occur even for a short transient time that both the first aperture 8 and the second aperture 9 are open together, i.e. that the first outlet port 97 is communicated via the upper chamber 67 to the lower chamber 68. Thus, during this transition, it is positively forbidden that cooling fluid which is at a low temperature, having been cooled by the radiator 45 or having come from the upstream end of the main recirculation conduit 44 and thus being quite cold, should be sucked into the upper end of the block recirculation conduit 51 and should pass down said block recirculation conduit 51 to enter into the block cooling jacket 35 by way of the cylinder block pump 41. This therefore avoids it occurring that the temperature of the cooling fluid which is passing through the block cooling jacket 35 temporarily should drop down, which accordingly minimizes thermal shock to the cylinder block 33 and also ensures that the heater 52 does not suffer a deterioration in function, even for a brief time period.

A SECOND EXEMPLARY COOLING SYSTEM USING THE THIRD EMBODIMENT

Figure 5:
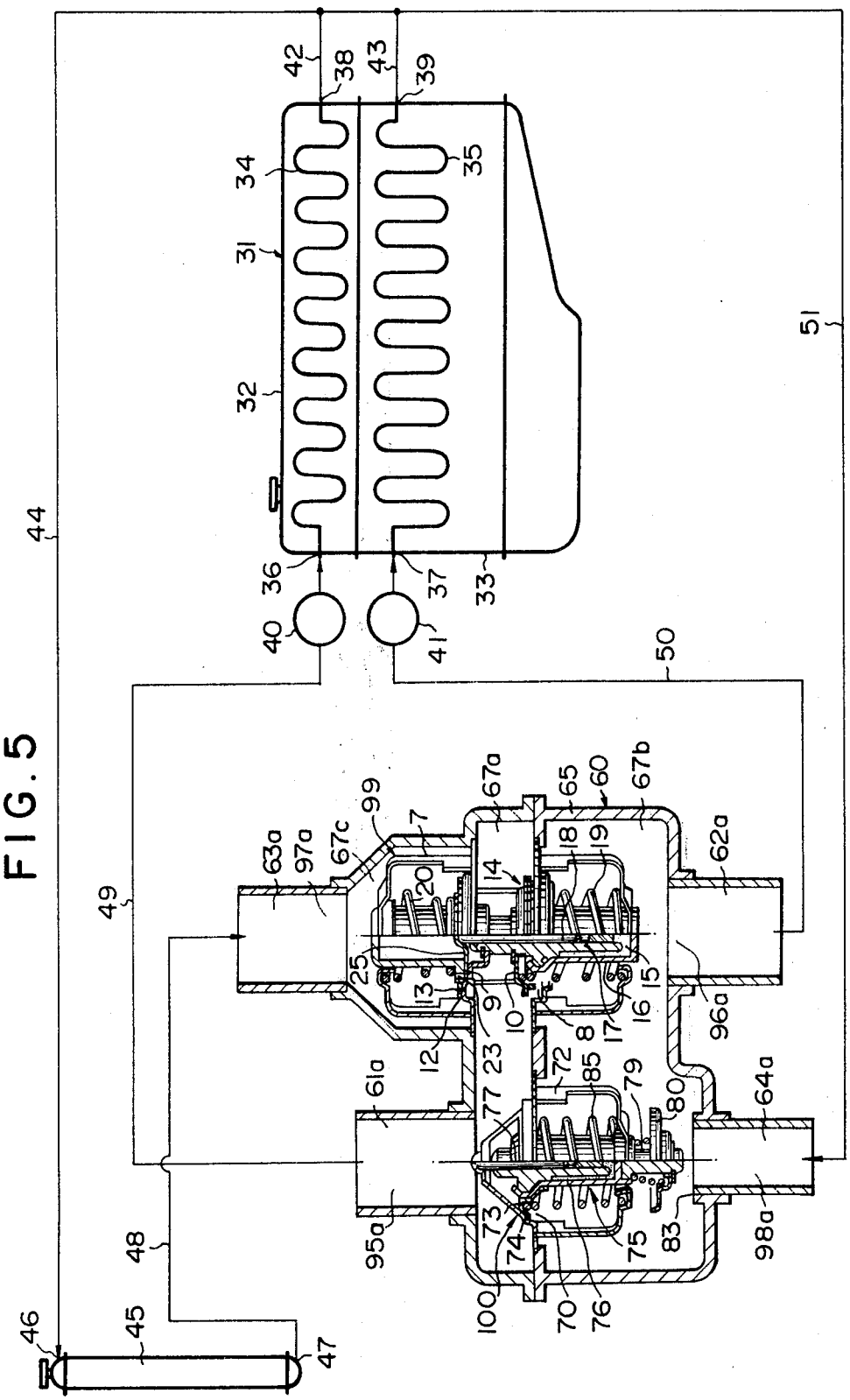
FIG. 5 is a diagrammatical view, similar to FIG. 2, showing an internal combustion engine and a cooling system thereof, said cooling system incorporating a control valve assembly which includes a valve according to the third preferred embodiment of the present invention shown in FIG. 4, and being of a type in which the control valve assembly is located proximate to the inlets of the cylinder head cooling jacket and the cylinder block cooling jacket.

In FIG. 5, this third preferred embodiment of the valve according to the present invention shown in detail in FIG. 4 and described above is shown as being used in a second cooling system for an internal combustion engine, which is again of a sort proposed in the above mentioned prior U.S. Pat. No. 4,370,950 made by the same applicant and assigned to the same assignee as the present application. In FIG. 5, parts and apertures of the valve shown (but not the chambers, or the valve casing or the inlet and outlet ports which are not part of the valve according to the present invention but are ancillary thereto), which correspond to parts and apertures of the third preferred embodiment of the valve according to the present invention shown in detail in FIG. 4, and which have the same functions, are designated by the same reference numerals and symbols as in that figure; and, further, parts shown which correspond to parts of the first exemplary cooling system shown in FIG. 2, and which have the same functions, are also designated by the same reference numerals and symbols as in that figure.

In this second exemplary cooling system, the layout of the various cooling passages and of a valve assembly 60 incorporated therein is quite different from the layout used in the first exemplary cooling system, previously described. In particular, the valve assembly 60, in this second exemplary cooling system, is provided at the intake sides of the head cooling jacket 34 and of the block cooling jacket 35, rather than at their output sides as was the case with the valve assembly 30 in the first exemplary cooling system shown in FIG. 2. However, the actual construction of the valve assembly 60 in this second exemplary cooling system is exactly the same as the construction of the valve assembly 30 of the first exemplary cooling system shown in FIG. 2, although the connections to the ports of this valve assembly 60 of the second examplary cooling system, as will be seen later, are quite different from the connections in the previously shown first exemplary cooling system.

In FIG. 5, which is a diagrammatical view, the reference numeral 31 denotes the internal combustion engine, which comprises a cylinder head 32 and a cylinder block 33 which are clamped together, optionally with the intervention therebetween of a cylinder head gasket which is not shown. The internal combustion engine 31 includes at least one combustion chamber, which is also not shown, and the cylinder head 32 defines the upper part of this combustion chamber, i.e. the part thereof in which the compression and the ignition occurs, and the surface of which upper part therefore receives the greater proportion of the heat generated in said combustion chamber. The cylinder head 32 is formed with a head cooling jacket 34 which extends close to a large part of said upper part of said combustion chamber, so as, when said head cooling jacket 34 is filled with cooling fluid such as water, to cool said upper part of said combustion chamber, and so as to cool said cylinder head 32. Typically, the internal combustion engine 31 will in fact include several such combustion chambers, and the head cooling jacket 34 will extend past the upper parts of each of these combustion chambers. Cooling fluid is supplied into the head cooling jacket 34 through a cylinder head inlet 36, and is taken out from the head cooling jacket 34 through a cylinder head outlet 38.

Similarly, the cylinder block 33 is formed with a block cooling jacket 35 which extends close to a large part of the side wall defining surface of said combustion chamber, so as, when said block cooling jacket 35 is filled with cooling fluid such as water, to cool said side wall part of said combustion chamber, and so as to cool said cylinder block 33. Again, of course, typically the cylinder block 33 will in fact define several such combustion chamber walls or bores, and the block cooling jacket 35 will extend past the side walls of each of these bores. Cooling fluid is supplied into the block cooling jacket 35 through a cylinder block inlet 37, and is taken out of the block cooling jacket 35 through a cylinder block outlet 39. Further, a cooling radiator 45 of a conventional sort, formed with an inlet 46 positioned at an upper portion thereof and an outlet 47 positioned at a lower portion thereof, is provided for the internal combustion engine 31.

As has been previously explained, during operation of the internal combustion engine 31, the major portion of the head generated in the combustion chambers thereof is communicated to the cylinder head 32, and only a minor portion of the heat generated in the combustion chambers is communicated directly to the cylinder block 33 of said internal combustion engine 31. Therefore, an imbalance of heating occurs betwen the cylinder head 32 and the cylinder block 33, and a second exemplary cooling system for cooling the internal combustion engine 31, which corrects said imbalance, will now be explained.

A cylinder head pump 40 is provided proximate to the cylinder head inlet 36, for impelling cooling fluid through the head cooling jacket 34 from the cylinder head inlet 36 to the cylinder head outlet 38; and, similarly, a cylinder block pump 41 is provided, proximate to the cylinder block inlet 37, for impelling cooling fluid through the block cooling jacket 35 from the cylinder block inlet 37 to the cylinder block outlet 39. Cooling fluid is provided to the intake side of the cylinder head pump 40 from the downstream end of a head input conduit 49, and similarly cooling fluid is provided to the intake side of the cylinder block pump 41 from the downstream end of a block input conduit 50. To the cylinder head outlet 38 there is connected the upstream end of a head output conduit 42, and to the cylinder block outlet 39 there is connected the upstream end of a block output conduit 43.

The downstream ends, i.e. the ends remote from the internal combustion engine 31, of the head output conduit 42 and of the block output conduit 43 are connected to the upstream end of a main recirculation conduit 44 and also to the upstream end of a block recirculation conduit 51. The downstream end of said main recirculation conduit 44 is connected to the inlet 46 of the radiator 45, and the outlet 47 of the radiator 45 is connected to the upstream end of a radiator output conduit 48.

The upstream end of the head input conduit 49 is connected to the downstream end of a first union pipe 61a, the upstream end of which is connected to a first outlet port 95a of a valve assembly 60 which will be explained in detail later. The upstream end of the block input conduit 50 is connected to the downstream end of a second union pipe 62a, the upstream end of which is connected to a second outlet port 96a of said valve assembly 60. The downstream end of the radiator output conduit 48 is connected to the upstream end of a third union pipe 63a, the downstream end of which is connected to a first inlet port 97a of said valve assembly 60. Finally, the downstream end of the block recirculation conduit 51 is connected to the upstream end of a fourth union pipe 64a, the downstream end of which is connected to a second inlet port 98a of said valve assembly 60.

As will be seen hereinafter, the block recirculation conduit 51, via the valve assembly 60, can communicate the cylinder block outlet 39 to the cylinder block inlet 37 via the cylinder block pump 41 and possibly also the cylinder head outlet 38 to the cylinder head inlet 36 via the cylinder head pump 40, bypassing the radiator 45; and the main recirculation conduit 44, again via said valve assembly 60, can communicate the cylinder head outlet 38 to the cylinder head inlet 36 via the cylinder head pump 40 and possibly also the cylinder block outlet 39 to the cylinder block inlet 37 via the cylinder block pump 41, through the radiator 45.

The particular construction and the per se operation of the valve assembly 60 used in this second exemplary cooling system will not be explained in detail, since as explained above said construction and per se operation are exactly the same as the construction and per se operation of the valve assembly 30 of the first exemplary cooling system shown in FIG. 2, although the connections to the ports of this valve assembly 60 of the second exemplary cooling system are different in that: what was the first inlet port 95 in the valve assembly 30 of the first examplary cooling system has become the first outlet port 95a in the valve assembly 60 of this second exemplary cooling system; what was the second inlet port 96 in the valve assembly 30 of the first exemplary cooling system has become the second outlet port 96a in the valve assembly 60 of this second exemplary cooling system; what was the first outlet port 97 in the valve assembly 30 of the first exemplary cooling system has become the first inlet port 97a in the valve assembly 60 of this second exemplary cooling system; and what was the second outlet port 98 in the valve assembly 30 of the first exemplary cooling system has become the second inlet port 98a in the valve assembly 60 of this second exemplary cooling system. In fact, any of the valve assemblies such as the valve assembly 60 which included a first control valve according to the first, second, or third, preferred embodiments of the valve according to the present invention shown in FIGS. 1, 3, or 4 respectively could also be used in a cooling system such as this second exemplary cooling system, instead of the shown valve assembly 60 which follows the construction of the valve assembly 60 of the first exemplary cooling system shown in FIG. 2.

THE OPERATION OF THE SHOWN SECOND EXEMPLARY COOLING SYSTEM

Now, the operation of the second exemplary cooling system described above will be explained.

First, if the cooling fluid passing along the block recirculation conduit 51 and as will be seen later entering the lower chamber 67b of the valve assembly 60 so as to fill it is at a temprature less than the first predetermined temperature value, which again may be taken exemplarily as 80° C., then it is considered, according to the operation of this second exemplary cooling system, that the internal combustion engine 31 is being warmed up from the cold condition. At this time, the valve assembly 60 is in the state shown in FIG. 5.

That is to say, the temperature of the mass of thermally expansible material 15 in the first control valve 99 is of course also below said predetermined first temperature of 80° C., and at this time said mass of thermally expansible material 15 is in a solid state and does not exert significant pressure on the lower end of the valve needle 18, and therefore the valve needle 18 and the second valve element 12 which moves along therewith are positioned, by the biasing action of the compression coil spring 20, to their lower positions in which they are shown in FIG. 5, in which the second valve element 12 is seated against the second valve seat 13 and closes the circular hole 9 therethrough thus breaking communication between the upper chamber 67c and the first inlet port 97a, i.e. blocking said first inlet port 97a, and in which the first valve element 10 which is attached to the needle guide 17 which is fixed with respect to the outer casing of the first temperature sensitive actuator 16 is positioned to its upper position in the sense of FIG. 5, in which it is moved away from the first valve seat 11, by the biasing action of the compression coil spring 19, and opens the circular hole therethrough thus establishing communication between the middle chamber 67a and the lower chamber 67b, i.e. opening the first communication port 8. Thus, the first outlet port 95a is put out of communication from the first inlet port 97a, but is communicated with the lower chamber 67b.

Further, the temperature of the cooling fluid within the lower chamber 67b is of course a fortiori below said predetermined second value, which has been taken exemplarily as 95° C., and thus the temperature of the mass of thermally expansible material in the second temperature sensitive actuator 75 of that second control valve 100 (which, as in the first exemplary cooling system shown in FIG. 2, is of a kind shown in the previously mentioned prior arts, and does not embody the present invention) is also of course below said predetermined second temperature, and at this time said mass of thermally expansible material is in a solid state and does not exert significant pressure on the lower end of the valve needle 77 of that second control valve 100, and therefore the outer shell of the temperature sensitive valve actuator 75, the first valve element 73 fixed thereto, and the valve shaft 79 and the second valve element 80 fixed thereto are positioned, by the biasing action of the compression coil spring 85, to their upper positions in which they are shown in FIG. 5, in which the first valve element 73 is seated against the first valve seat 74 and closes the circular hole therethrough thus breaking communication between the middle chamber 67a and the lower chamber 67b, i.e. blocking the second communication port 70, and in which the second valve element 80 is moved away from the second valve seat 83 and opens the circular hole therethrough, thus establishing communication between the lower chamber 67b and the second inlet port 98a, i.e. opening said second inlet port 98a. Thus, the second inlet port 98a is communicated with the lower chamber 67b.

Accordingly, in this operational state, since the first inlet port 97a is kept completely isolated by the closing of the hole 9 through the second valve seat 13 of the first control valve 99, no fluid flow can occur at this time through the main recirculation conduit 44, the radiator 45, and the radiator output conduit 48. Therefore, the flow of cooling fluid from the cylinder head outlet 38 passes out through the head output conduit 42 and enters into the upstream end of the block recirculation conduit 51 connected thereto, and also the flow of cooling fluid from the cylinder block outlet 39 passes out through the block output conduit 43 and enters into said upstream end of said block recirculation conduit 51 connected thereto. These two flows then flow along the block recirculation conduit 51, mixing therein with one another, and then flow into the lower chamber 67b of the valve assembly 60 through the second inlet port 98a which as mentioned above is opened at this time, this mixed cooling fluid flow not having been significantly cooled because it has not passed through the radiator 45. Part of this combined or mixed cooling fluid flow then enters from said lower chamber 67b into the middle chamber 67a of the valve assembly 60 through the first communication port 8, which as mentioned above is opened at this time, and from this middle chamber 67a said flow then passes out through the first outlet port 95a and is supplied to the inlet side of the cylinder head pump 40 via the head input conduit 49. The cylinder head pump 40 then pumps this cooling fluid back into the inlet 36 of the head cooling jacket 34 of the cylinder head 32. On the other hand, the rest of this combined or mixed cooling fluid flow from the block recirculation conduit 51 passes directly out from said lower chamber 67b of said valve assembly 60 through the second outlet port 96a and is supplied to the inlet side of the cylinder block pump 41 via the block input conduit 50. The cylinder block pump 41 then pumps this cooling fluid back into the inlet 37 of the block cooling jacket 35 of the cylinder block 2.

Of course, at this time, no substantial cooling action at all is provided in this mode of operation by the shown second exemplary cooling system to the internal combustion engine 31 as a whole, because the radiator 45 is at this time receiving no substantial flow of cooling fluid; and the operation of said second exemplary cooling system is only to redistribute heat which is being produced by combustion within the combustion chamber or chambers of the internal combustion engine 31 from the cylinder head 32 thereof, which as mentioned above directly receives most of the generated heat, to the cylinder block 33 thereof which directly receives only a minor part of the generated heat.

As a result of the above described mode of operation, the warming up characteristic of the cylinder block 33 is much improved, as compared with the conventional case in which the cooling system for the cylinder head 32 is entirely separated from the cooling system for the cylinder block 33. Since it is desirable to raise the temperature of the cylinder block 33 fairly quickly from the cold condition, in order to minimize frictional losses during the warming up process of the internal combustion engine by heating up the lubricating oil contained within it as quickly as possible, and also in order to minimize fuel utilization during engine warmup, and in order to minimize engine wear, especially cylinder bore wear, before the engine block is fairly hot, as well as to minimize the emission of noxious components in the exhaust gases of the engine when it is being operated in the cold condition, the above described construction according to the second exemplary cooling system is very advantageous.

On the other hand, if the cooling fluid passing along the block recirculation conduit 51 is at a temperature higher than the first predetermined temperature value, which has been taken exemplarily as 80° C., then it is considered, according to the operation of this second exemplary cooling system, that the internal combustion engine 31 is fully warmed up from the cold condition. Support further for the time being that said cooling fluid passing along the block recirculation conduit 51 is at a temperature lower than the second predetermined temperature value, which may again be taken exemplarily as 95° C. At this time, the valve assembly 60 is in the state which will now be described.

The temperature of the mass of thermally expansible material 15 in the first control valve 99 is of course at this time also above said predetermined first temperature of 80° C., and thus at this time said mass of thermally expansible material 15 is melted and is in the liquid state and has expanded very substantially as compared to its solid state, thus coming to exert significant pressure on the lower end of the valve needle 18, and therefore the valve needle 18 and the second valve element 12 which moves along therewith are now positioned, against the biasing action of the compression coil spring 20 which is overcome, to their upper positions in the sense of FIG. 5, in which the second valve element 12 is moved away from the second valve seat 13 and opens the circular hole 9 therethrough thus establishing communication between the middle chamber 67a and the upper chamber 67c, i.e. opening the first inlet port 97a, and in which the first valve element 10 which is attached to the needle guide 17 which is fixed with respect to the outer casing of the first temperature sensitive actuator 16 is now positioned, against the biasing action of the compression coil spring 19 which is overcome, to its lower position in the sense of FIG. 5, in which it is seated against the first valve seat 11 and closes the circular hole therethrough thus breaking communication between the middle chamber 67a and the lower chamber 67b, i.e. blocking the first communication port 8.

Further, since the temperature of the cooling fluid within the lower chamber 67b is as presently assumed below said predetermined second temperature which has been taken exemplarily as 95° C., therefore the temperature of the mass of thermally expansible material in the second control valve 100 is of course also below said second predetermined temperature of 95° C., and thus at this time said mass of thermally expansible material is in a solid state and does not exert significant pressure on the lower end of the valve needle 77 of this second control valve 100, and therefore the outer shell 76 of the second temperature sensitive valve actuator 75, the first valve element 73 attached thereto, and the valve shaft 79 and the second valve element 80 attached thereto are still positioned, as before, by the biasing action of the compression coil spring 85 to their upper positions in which they are shown in FIG. 5, in which the first valve element 73 is still seated against the first valve seat 74 and closes the circular hole therethrough thus breaking communication between the middle chamber 67a and the lower chamber 67b, i.e. blocking the second communication port 70, and in which the second valve element 80 is still moved away from the second valve seat 83 and opens the circular hole therethrough thus still establishing communication between the lower chamber 67b and the second inlet port 98a, i.e. opening said second inlet port 98a.

Accordingly, in this operational state, since the first communication port 8 and also the second communication port 70 are both kept completely closed, no substantial mixing can occur between the flow of cooling fluid that is passing out of the cylinder head cooling jacket 34 through the cylinder head outlet 38, which passes down the main recirculation conduit 44 through the radiator 45 in which it is cooled, and thence passes via the radiator output conduit 48 into the middle chamber 67a of the valve assembly 60 in through the first inlet port 97a and via the upper chamber 67c, and the flow of cooling fluid that is passing out of the cylinder block cooling jacket 35 through the cylinder block outlet 39, which passes along the block recirculation conduit 51 so as to pass into the lower chamber 67b of the valve assembly 60 through the second inlet port 98a, not being substantially cooled en route.

Thus, the first above described flow of cooling fluid which has passed through the head cooling jacket 34 and has been heated therein and has passed through the radiator 45 and has been cooled therein flows out from the middle chamber 67a of the valve assembly 60 through the first outlet port 95a, whence it passes into the upstream end of the head input conduit 49. Then, this cooling fluid flow passes down through the head input conduit 49 so as to be supplied to the inlet of the cylinder head pump 40, which pumps it into the cylinder head inlet 36, whence said cooling fluid flow is returned to the head cooling jacket 34.

On the other hand, the second above described flow of cooling fluid which has passed through the block cooling jacket 35 and has been heated therein and has flowed down the block recirculation conduit 51 without being substantially cooled while passing therealong flows out from the lower chamber 67b of the valve assembly 60 through the second outlet port 96a, whence it passes into the upstream end of the block input conduit 50. Then, this cooling fluid flow passes down through the block input conduit 50 so as to be supplied to the inlet of the cylinder block pump 41, which pumps it into the cylinder block inlet 37, whence said cooling fluid flow is returned to the block cooling jacket 35.

Of course, at this time substantially no cooling action at all is provided in this mode of operation by this second exemplary cooling system to the cylinder block 33, because said cylinder block 33 is receiving no flow of cooling fluid which has passed through the radiator 45;

and the operation of the shown second exemplary cooling system is only to cool the cylinder head 32 of the internal combustion engine 31, which directly receives most of the heat generated by combustion in the combustion chamber or chambers thereof by using the maximum cooling capacity of the radiator 45, but not to cool the cylinder block 33 which directly receives only a minor part of the generated heat.

Suppose now, on the other hand, that said cooling fluid passing along the block recirculation conduit 51 (which has been heated only in the cylinder block 33 and not in the cylinder head 32, and which has not been substantially cooled) comes to be at a higher temperature than the second predetermined temperature value which has been taken exemplarily as 95° C. At this time, the valve assembly 60 transits to the state which will now be described.

The temperature of the mass of thermally expansible material 15 in the first thermo sensitive actuator of the first control valve 99 of course remains above the first predetermined temperature of exemplarily 80° C., and thus at this time said mass 15 of thermally expansible material remains melted and in the liquid state as expanded very substantially as compared to its solid state, thus continuing to exert significant pressure on the lower end of the valve needle 18, and therefore said valve needle 18 and the second valve element 12 which moves along therewith remain positioned, against the biasing action of the compression coil spring 20 which continues to be overcome, to their upper positions in the sense of FIG. 5, in which the second valve element 12 is moved away from the second valve seat 13 and opens the circular hole 9 therethrough thus establishing communication between the middle chamber 67a and the upper chamber 67c, i.e. opening the first inlet port 97a, and in which the first valve element 10 which is attached to the needle guide 17 which is fixed with respect to the outer casing of the first temperature sensitive actuator 16 is now positioned, against the biasing action of the compression coil spring 19 which continues to be overcome, to its lower position in the sense of FIG. 5, in which said first valve element 10 is seated against the first valve seat 11 and closes the circular hole therethrough thus breaking communication between the middle chamber 67a and the lower chamber 67b, i.e. blocking the first communication port 8.

However, since the temperature of the cooling fluid within the lower chamber 67b now has come to be above said predetermined second temperature which has exemplarily been taken as 95° C., therefore the temperature of the mass of thermally expansible material in the second thermo sensitive actuator 75 of the second control valve 100 is of course also now above said predetermined second temperature of 95° C., and thus at this time said mass of thermally expansible material has melted and has come to be in the liquid state and has expanded very substantially, and thus has come to exert significant pressure on the lower end of the valve needle 77 of the second control valve 100, and therefore the outer shell 76 of the temperature sensitive valve actuator 75, the first valve element 73, and the valve shaft 79 and the second valve element 80 which are attached thereto are now positioned, against the biasing action of the compression coil spring 85 which is now overcome, to their lower positions in the sense of FIG. 5, in which the first valve element 73 is moved away from the first valve seat 74 and opens the circular hole therethrough thus establishing communication between the middle chamber 67a and the lower chamber 67b, i.e. opening the second communication port 70, and in which the second valve element 80 is seated against the second valve seam 83 and closes the circular hole therethrough, thus breaking communication between the lower chamber 67b and the second inlet port 98a, i.e. closing said second inlet port 98a. In this operational state, since the second inlet port 98a is now completely closed, no substantial flow of cooling fluid can take place through the block recirculation conduit 51. However, as will be explained in some detail later, actually in practical operation of the shown second exemplary cooling system this operational state described above is never completely and properly maintained to its full extent for any substantial length of time, due to an oscillation effect of the action of the second control valve 100. However, herein the description of this operational state will be made under the assumption that it is being completely and properly maintained by the shown second exemplary cooling system.

Thus, the flow of cooling fluid which has passed through the block cooling jacket 35 and has been heated therein flows out from the cylinder block outlet 39 and enters into the upstream end of the main recirculation conduit 44, in which it mixes with the flow of cooling fluid which has passed through the head cooling jacket 34 and has been heated therein and has flowed out of the cylinder head outlet 38 and has also entered into the upstream end of said main recirculation conduit 44. These two mixed flows then pass down along said main recirculation conduit 44, then enter into the inlet 46 of the radiator 45, and are then cooled within said radiator 45 in a per se well known fashion. Then these mixed flows pass out of the outlet 47 of the radiator 45 into the upstream end of the radiator output conduit 48, along which they flow, and from the downstream end of which they pass through the first inlet port 97a of the valve assembly 60 to enter into the upper chamber 67c of the valve assembly 60, whence they pass, via the port 9 which as mentioned above is open at this time, into the middle chamber 67a of said valve assembly 60. Part of this combined and mixed flow of cooling fluid then enters from said middle chamber 67a via the first outlet port 95a into the upstream end of the head input conduit 49 so as to be supplied to the inlet of the cylinder head pump 40, which pumps said cooling fluid flow into the cylinder head inlet 36, whence it is returned to the head cooling jacket 34; and also a part of this mixed cooling fluid flow passed from said middle chamber 67a through the second communication port 70 which as mentioned above is open at this time to enter into the lower chamber 67b of the valve assembly 60, whence via the second outlet port 96a it passes into the upstream end of the block input conduit 50 so as to be supplied to the inlet of the cylinder block pump 41, which pumps said cooling fluid flow into the cylinder block inlet 37, whence it is returned to the block cooling jacket 35.

Of course, at this time, cooling action is provided in this mode of operation by the shown second exemplary cooling system both to the cylinder head 32 of the internal combustion engine 31 and also to the cylinder block 33 thereof, because both the cylinder head 32 and also the cylinder block 33 are receiving flow of cooling fluid which has passed through the radiator 45; and the function in this operational mode of the shown second exemplary cooling system is not only to cool the cylinder head 32 of the internal combustion engine 31 which directly receives most of the heat generated by combustion in the combustion chamber or chambers thereof, but also to cool the cylinder block 33 which directly receives only a minor part of the generated heat, but which is in fact somewhat overheated at this time.

As a result of the above explained modes of operation, when the temperature of the cooling fluid within the lower chamber 67b of the valve assembly 60 which has flowed through the block cooling jacket 35 to cool it and has been heated therein and has flowed out from the cylinder block outlet 39 down the block recirculation conduit 51 without being substantially cooled and has flowed in through the second inlet port 98a into said lower chamber 67b comes to be above said predetermined second temperature which has been exemplarily taken as 95° C. from being below said predetermined second temperature, immediately the state of the thermo sensitive actuator 75 of the second control valve 100 alters due to the melting of its mass of thermally expansible material, and the second inlet port 98a which was open before is closed while the second communication port 70 which was closed before is opened; and thereby the cooling system, form its operational mode in which the cylinder head 32 alone was cooled by using the maximum cooling capacity of the radiator 45 while the cylinder block 33 was not cooled at all, transits to its operational mode in which the cylinder head 32 and the cylinder block 33 are cooled together by the cooling fluid flows which pass through them being mixed before both passing through the radiator 45 to be cooled therein.

Thus, in this case, soon the temperature of the cooling fluid which has flowed through the block cooling jacket 35 to cool it and has been heated therein and has flowed out from the cylinder block outlet 39 down the block recirculation conduit 51 and through the second inlet port 98a into said lower chamber 67b drops and comes to be below said predetermined second temperature (exemplarily 95°) from being above said predetermined second temperature, and then immediately the state of the second control valve 100 again alters due to the solidifying of the mass of thermally expansible material in its second thermo sensitive actuator 75, and the second inlet port 98a which was closed before is opened while the second communication port 70 which was opened before is closed; and thereby the cooling system, from its operational mode in which the cylinder head 32 and the cylinder block 33 were cooled together by the cooling fluid flows which passed through them being mixed before passing through the radiator 45 to be both cooled therein transits back to its operational mode in which the cylinder head 32 alone is cooled by using the maximum cooling capacity of the radiator 45 while the cylinder block 33 is not cooled at all. Thus, in this case, soon the temperature of the cooling fluid which has flowed through the block cooling jacket 35 to cool it and has been heated therein and has flowed out from the cylinder block outlet 39 down the block recirculation conduit 51 through the second inlet port 98a into said lower chamber 67b of the valve assembly 60 again rises and comes to be above said predetermined second temperature from being below said predetermined second temperature.

By a repetition of this to and fro action of the second control valve 100, therefore, the temperature of the cooling fluid which has flowed through the block cooling jacket 35 to cool it and has been heated therein and has flowed out from the cylinder block outlet 39 down the block recirculation conduit 51 and through the second inlet port 98a into said lower chamber 67b of the valve assembly 60 is kept quite near the second predetermined temperature of exemplarily 95° C., by said block cooling fluid flow being alternately passed through the block recirculation conduit 51 to be recirculated to the cylinder block 33 without being substantially cooled, or being mixed with the head cooling fluid flow in the main recirculation conduit 44 and being passed through the radiator 45 to be cooled. Thus the temperature of the cylinder block 33 is regulated to a proper quite high value, substantially higher than the temperature of the cylinder head 32, without being allowed to rise to an excessively high level.

In other words, by the combination of these two actions of the second control valve 100, according as to whether the temperature of the cooling fluid flowing out of the cylinder block outlet 39 of the block cooling jacket 35 is less than said second predetermined temperature value of exemplarily 95° C., or alternatively is greater than said second predetermined temperature value, therefore, in a feedback manner, the temperature of the cooling fluid passing out through the cylinder block outlet 39 of the block cooling jacket 35 is maintained substantially to be at the second above described predetermined temperature of 95° C. This means that the temperature of the cylinder block 33 as a whole is maintained substantially at a temperature value somewhat above, but not too much above, said second predetermined temperature value, i.e. in the shown second exemplary cooling system is maintained at a temperature somewhat above 95° C., which is of course substantially higher than the temperature at which the cylinder head 32 is being maintained at this time, since the cooling fluid which is circulating through the head cooling jacket 34 is entirely, as described above, cooling fluid which has passed through the radiator 45 to be cooled, and is accordingly quite cool.

With regard particularly to the operation of this second exemplary cooling system, this to and fro action of the second control valve 100 for regulating the temperature of the cylinder block 33 is in fact finer and more stable than the to and fro action of the first exemplary cooling system shown in FIG. 2 and described above, because actually as soon as the second control valve 100 starts to transit from its first above described operational condition in which the cylinder head 32 alone is cooled by using the maximum cooling capacity of the radiator 45 while the cylinder block 33 is not cooled at all, to its operational condition in which the cylinder head 32 and the cylinder block 33 are cooled together by the cooling fluid flows which passes through them being mixed before passing through the radiator 45 to be both cooled therein, then as soon as the second communication port 70 opens even partially a quantity of cooling fluid which is within the middle chamber 67a of the valve assembly 60 and which is at a temperature substantially lower than the second predetermined temperature value (exemplarily 95° C.) passes through this second communication port 70 and impinges on the outer casing of the temperature sensitive actuator 75 of the second control valve 100, and when this happens this will tend to cause the second control valve 100 to transit back toward its first above described operational condition in which the cylinder head 32 alone is cooled by using the maximum cooling capacity of the radiator 45 while the cylinder block 33 is not cooled at all; but of course said second control valve 100 cannot completely transit to this first operational condition, due to the high temperature of the cooling fluid which is passing down the block recirculation conduit 51 to enter the lower chamber 67b of the valve assembly 60 through the second inlet port 98a thereof. In other words, an oscillating balance is struck in the operation of this second control valve 100, in which a proportion of the cooling fluid which passes through the block cooling jacket 35 is recirculated down the main recirculation conduit 44 and passes through the radiator 45 to be cooled, while the rest of said cooling fluid which passes through the block cooling jacket 35 is recirculated down the block recirculation conduit 51, to not be substantially cooled; and this oscillating balance is so reached as to keep the temperature of said cooling fluid which is passing through the block cooling jacket 35 at approximately the second predetermined temperature of exemplarily 95° C. In fact, this balance, in this second exemplary cooling system, has been determined in practice to be more stable and more accurate than the balance described with respect to the first exemplary cooling system shown in FIG. 2.

Accordingly, by thus keeping the cylinder head 32 substantially cooler than the cylinder block 33 during warmed up operation of the internal combustion engine 31, the cylinder block 33 may be kept significantly hotter than is possible with a conventional cooling system in which the head cooling fluid and the block cooling fluid are both always being passed through the same radiator and are being cooled together. Further, the temperature of the lubricating oil contained within the internal combustion engine 31 is at this time kept at at least the temperature of the cylinder block 33, and in fact is maintained at a significantly higher temperature, due to the dissipation of mechanical energy therein. Of course, by keeping the cylinder head 32 as cool as possible, and by using as much of the capacity of the radiator 45 as possible for cooling the cylinder head 32, the possibility of the occurrence of knocking or pinking in the internal combustion engine 31 is greatly reduced. The keeping of the cylinder block 33 as hot as possible within a predetermined temperature limit, i.e. substantially at the second predetermined temperature value of exemplarily 95° C., ensures that frictional losses in the internal combustion engine 31 are kept as low as possible, and also is beneficial with regard to the minimization of the amount of noxious components which are emitted in the exhaust gases of the internal combustion engine 31.

Further, in contrast to a conventional type of cooling system as previously discussed above in which completely separate cooling systems are used for the cylinder head and for the cylinder block, the full capacity of the radiator 45 can be effectively utilized according to the second exemplary cooling system as described above, because of the flexibility available for determining the proportions of the cooling capacity of the radiator which can be allocated to the cylinder head 32 and to the cylinder block 33 for cooling them.

Thus it is seen that, in this second exemplary cooling system also, in which the position of the valve assembly 60 is substantially reversed as compared with the first exemplary cooling system shown, the same various advantages and benefits are available. The occurence of knocking in the cylinders of the internal combustion engine 31 is guarded against by keeping the cylinder head 32 as cool as possible, and at the same time the cylinder block 33 is kept warmer than in the type of prior art in which the block cooling fluid flow and the head cooling fluid flow are mixed at all times. Further, the warming up time for the internal combustion engine 31 is kept minimal, and hence wear thereof during warming up, and consumption of fuel during this warm up period, are minimized.

Further, with regard to the matter of a heater fitted in the passenger compartment of a vehicle to which the internal combustion engine 31 incorporating the shown second exemplary cooling system is fitted, when this heater is fitted as is customary so as either to use heated cooling fluid taken from an intermediate portion of the block output conduit 43 or to use heated cooling fluid diverted via a conduit from an intermediate part of the block recirculation conduit 51, in other words so as to use only cooling fluid from the cylinder block 33 for heating the heater core, rather than cooling fluid from the cylinder head 32 or a mixture of cooling fluid from the cylinder block 33 and the cylinder heat 32, then a better heating effect is made available. This is because the cooling fluid of the cylinder block 33 is, as explained above, kept by the shown second exemplary cooling system generally hotter than is the cooling fluid of the cylinder head 32.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. A valve for controlling mutual communication between a first chamber space, a second chamber space, and a third chamber space, comprising:

a first valve seat and a first valve element which cooperates with said first valve seat by to and fro motion towards and away from said first valve seat so as to open and close a first controlled aperture through said first valve seat, said first controlled aperture being on a first fluid flow path between said first chamber space and said second chamber space;

a second valve seat and a second valve element which cooperates with said second valve seat by to and fro motion towards and away from said second valve seat so as to open and close a second controlled aperture through said second valve seat, said second controlled aperture being on a second fluid flow path between said first chamber space and said third chamber space;

a first means for biasing said first valve element in a first direction away from said first valve seat;

a second means for biasing said second valve element in a second direction opposite to said first direction towards said second valve seat with a biasing force substantially greater than the biasing force exerted on said first valve element by said first biasing means;

a temperature sensitive actuator comprising a temperature sensitive means which senses the temperature of fluid generally around and impinging on it and changes its volume, a first actuating member and a second actuating member axially slidable in relation to each other, said temperature sensitive actuator as a whole being floatingly supported with said first actuating member bearing on said first valve element and said second actuating member bearing on said second valve element;

said temperature sensitive actuator functioning so as, with rise in the temperature of said fluid sensed by said temperature sensitive means, to move said first actuating member and said second actuating member with respect to one another in such mutual relative directions as to exert by said first actuating member a force on said first valve element in said second direction, first to move said first valve element towards said first valve seat so as first to close said first controlled aperture and so as first to interrupt communication along said first fluid flow path between said farst chamber space and said second chamber space, and to exert by said second actuating member a greater force on said second valve element in said first direction and secondly to move said second valve element away from said second valve seat so secondly as to open said second controlled aperture and so as secondly to establish communication along said second fluid flow path between said first chamber space and said third chamber space just after said first controlled aperture has been closed and the communication along said first fluid flow path between said first chamber space and said second chamber space has been interrupted.

2. A valve according to claim 1, wherein said first valve seat and said second valve element and said second valve seat all lie generally in planes perpendicular to a certain axis, and said mutual axial relative movement of said first actuating member and said second actuating member occurs along said axis, said second chamber space and said third chamber space lying generally on opposite sides of said first chamber space along said axis.

3. A valve according to claim 2, wherein said mutual axial relative movement of said first actuating member and said second actuating member as said temperature sensed by said temperature sensitive means rises is a movement of said first actuating member and said second actuating member along said axis away from one another, said first actuating member then exerting force on said first valve element so as to impel said first valve element, against the biasing action of said first biasing means, toward said first valve seat, and said second actuating member then exerting force on said second valve element so as to impel said second valve element, against the biasing action of said second biasing means, away from said second valve seat.

4. A valve according to claim 3, wherein said temperature sensitive actuator comprises an outer casing, a quantity of thermally expandable material held within said outer casing, a needle member extending within said outer casing so that its inner end is communicated to said quantity of thermally expandable material and extending out of said outer casing in a direction away therefrom, and a needle guide member fixed with respect to said outer casing which is formed with a guide hole which closely slidably receives said needle member; one of said first actuating member and said second actuating member being an assembly of said outer casing and said needle guide member, and the other being said needle member, and said temperature sensitive means comprising said thermal expandable material.

5. A valve according to claim 4, wherein said second actuating member is said needle member and said first actuating member is the assembly of said outer casing and said needle guide member; and wherein said needle member is abutted against the side of said second valve element towards said second valve seat.

6. A valve according to claim 5, wherein said first valve element is fixed around the outside of said outer casing.

7. A valve according to claim 5, wherein said needle guide member includes a portion which projects axially out from said outer casing, and wherein said first valve element is fixed around the outside of said axially projecting portion of said needle guide member, said outer casing lying entirely on the side of said first valve member towards said second chamber space.

8. A valve according to claim 1, further comprising a bypass valve port of relatively small cross sectional area which communicates between said first chamber space and said third chamber space and a bypass valve element which abuts against said bypass valve port, so as to close said bypass valve port, when said first valve element is at its fullest extended position removed from said first valve seat, and which is removed from said bypass valve port, thus opening said bypass valve port, when said first valve element is moved towards said first valve seat from its said fullest extended position by any amount larger than a relatively small amount.

9. A valve according to claim 5, further comprising a bypass valve port of relatively small cross sectional area, formed through said second valve element, which communicates between said first chamber space and said third chamber space and a bypass valve element, mounted to said needle valve guide, which abuts against said bypass valve port, so as to close said bypass valve port, when said first valve element is to its fullest extended position removed from said first valve seat and said needle valve guide is at its maximum extended position approached towards said second valve element, and which is removed from said bypass valve port, thus opening said bypass valve port, when said first valve element is moved towards said first valve seat from its said fullest extended position by any amount larger than a relatively small amount, and said needle valve guide is moved away from said second valve element from its said fullest extended position by said amount larger than said relatively small amount.

10. A valve according to claim 9, wherein, when said needle valve guide is in its said fullest extended position, the outer end of said needle valve guide member remote from said outer casing of said temperature sensitive actuator abuts against the side of said second valve element towards said first chamber space.

* * * * *